(12) United States Patent
Zhang et al.

(10) Patent No.: US 11,425,721 B2
(45) Date of Patent: Aug. 23, 2022

(54) METHODS AND APPARATUS TO FACILITATE DUPLEX MODE PER UPLINK CONTROL CHANNEL RESOURCE

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Somerset, NJ (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 17/112,897

(22) Filed: Dec. 4, 2020

(65) Prior Publication Data

US 2022/0182110 A1 Jun. 9, 2022

(51) Int. Cl.
*H04B 7/0408* (2017.01)
*H04B 7/06* (2006.01)
(Continued)

(52) U.S. Cl.
CPC ........ *H04W 72/046* (2013.01); *H04B 7/0408* (2013.01); *H04B 7/0695* (2013.01);
(Continued)

(58) Field of Classification Search
CPC ... H04B 7/02–12; H04B 17/0082–3913; H04J 11/0023–0093;
(Continued)

(56) References Cited

U.S. PATENT DOCUMENTS

2019/0021018 A1* 1/2019 Nagaraja ............. H04W 72/046
2019/0312698 A1 10/2019 Akkarakaran et al.
2021/0159966 A1* 5/2021 Xi ....................... H04W 72/046

FOREIGN PATENT DOCUMENTS

EP 3567781 A1 11/2019
EP 3734888 A1 11/2020

OTHER PUBLICATIONS

International Search Report and Written Opinion—PCT/US2021/061676—ISA/EPO—dated Apr. 4, 2022.

* cited by examiner

*Primary Examiner* — Timothy J Weidner
(74) *Attorney, Agent, or Firm* — Procopio, Cory, Hargreaves & Savitch LLP/Qualcomm

(57) ABSTRACT

Apparatus, methods, and computer-readable media for facilitating duplex mode per uplink control channel resource are disclosed herein. An example method for wireless communication at a user equipment includes receiving a physical uplink control channel (PUCCH) resource configuration from a base station, the PUCCH resource configuration indicating an uplink beam for transmitting an uplink transmission. The example method also includes identifying a downlink beam paired with the uplink beam for transmitting the uplink transmission, the paired downlink beam for full-duplex reception of a downlink transmission from the base station that overlaps in time with transmission of the uplink transmission. Additionally, the example method includes performing full-duplex communication with the base station by transmitting the uplink transmission using the uplink beam while receiving the downlink transmission using the paired downlink beam.

30 Claims, 14 Drawing Sheets

(51) Int. Cl.

| | |
|---|---|
| H04B 7/08 | (2006.01) |
| H04B 17/318 | (2015.01) |
| H04B 17/336 | (2015.01) |
| H04B 17/345 | (2015.01) |
| H04L 5/00 | (2006.01) |
| H04L 5/14 | (2006.01) |
| H04W 8/22 | (2009.01) |
| H04W 24/10 | (2009.01) |
| H04W 56/00 | (2009.01) |
| H04W 72/04 | (2009.01) |
| H04W 72/12 | (2009.01) |
| H04W 74/08 | (2009.01) |
| H04W 84/02 | (2009.01) |
| H04W 88/02 | (2009.01) |
| H04W 88/08 | (2009.01) |
| H04W 92/10 | (2009.01) |

(52) U.S. Cl.
CPC ........... *H04B 7/088* (2013.01); *H04B 17/318* (2015.01); *H04B 17/336* (2015.01); *H04B 17/345* (2015.01); *H04L 5/0076* (2013.01); *H04L 5/0092* (2013.01); *H04L 5/14* (2013.01); *H04W 8/22* (2013.01); *H04W 24/10* (2013.01); *H04W 56/001* (2013.01); *H04W 72/042* (2013.01); *H04W 72/0493* (2013.01); *H04W 72/1268* (2013.01); *H04W 72/1289* (2013.01); *H04W 74/0833* (2013.01); *H04W 84/02* (2013.01); *H04W 88/02* (2013.01); *H04W 88/08* (2013.01); *H04W 92/10* (2013.01)

(58) Field of Classification Search
CPC ...... H04J 2011/0003–0096; H04L 5/0001–26; H04W 8/22–245; H04W 24/02–10; H04W 28/02–26; H04W 48/02–20; H04W 56/0005–0095; H04W 72/005–14; H04W 74/002–0891; H04W 84/02–16; H04W 88/02–12; H04W 92/02; H04W 92/04; H04W 92/10
See application file for complete search history.

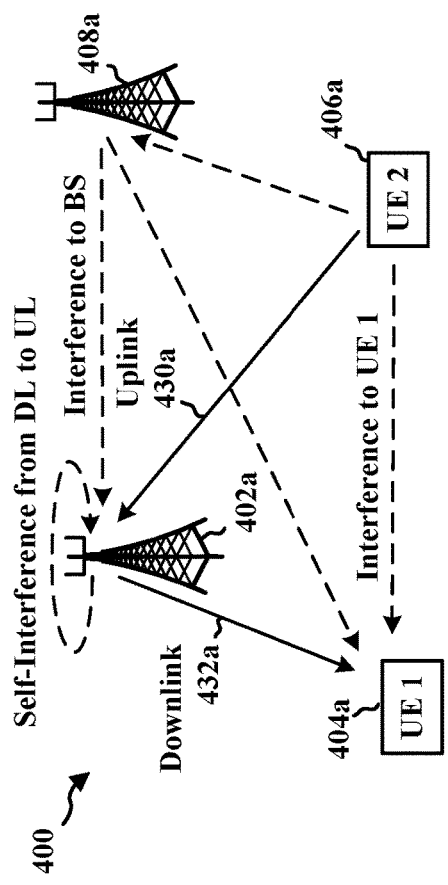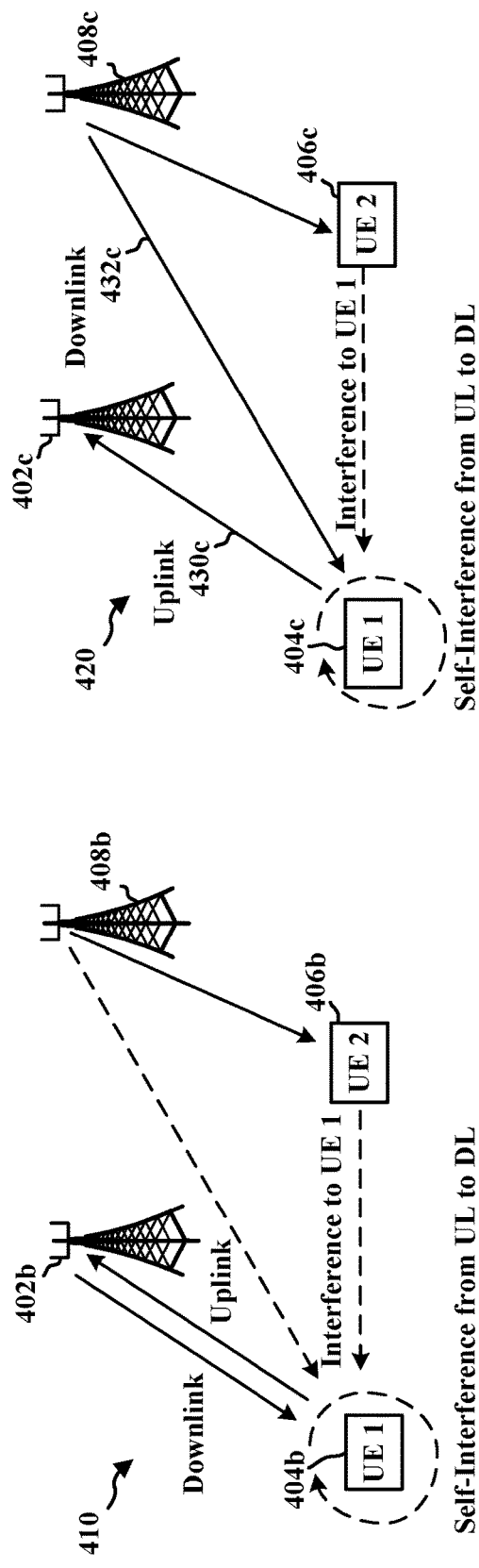
FIG. 4A
FIG. 4B
FIG. 4C

METHODS AND APPARATUS TO FACILITATE DUPLEX MODE PER UPLINK CONTROL CHANNEL RESOURCE

BACKGROUND

Technical Field

The present disclosure relates generally to communication systems, and more particularly, to wireless communications including full-duplex communications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication of a user equipment (UE). An example apparatus receives a physical uplink control channel (PUCCH) resource configuration from a base station. The PUCCH resource configuration indicates an uplink beam for transmitting an uplink transmission. The example apparatus also identifies a downlink beam paired with the uplink beam for transmitting the uplink transmission, the paired downlink beam for full-duplex reception of a downlink transmission from the base station that overlaps in time with transmission of the uplink transmission. Additionally, the example apparatus performs full-duplex communication with the base station by transmitting the uplink transmission using the uplink beam while receiving the downlink transmission using the paired downlink beam.

In another aspect of the disclosure, a method, a computer-readable medium, and an apparatus are provided for wireless communication of a base station. An example apparatus transmits a PUCCH resource configuration to a UE. The PUCCH resource configuration may indicate an uplink beam for receiving an uplink transmission. The example apparatus also determines a downlink beam paired with the uplink beam for receiving the uplink transmission, the paired downlink beam for full-duplex transmission of a downlink transmission to the UE that overlaps in time with reception of the uplink transmission. Additionally, the example apparatus performs full-duplex communication with the UE by transmitting the downlink transmission using the paired downlink beam while receiving the uplink transmission using the uplink beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4A is a diagram illustrating a first example of full-duplex wireless communication, in accordance with various aspects of the present disclosure.

FIG. 4B is a diagram illustrating a second example of full-duplex wireless communication, in accordance with various aspects of the present disclosure.

FIG. 4C is a diagram illustrating a third example of full-duplex wireless communication, in accordance with various aspects of the present disclosure.

DETAILED DESCRIPTION

Figure 1:
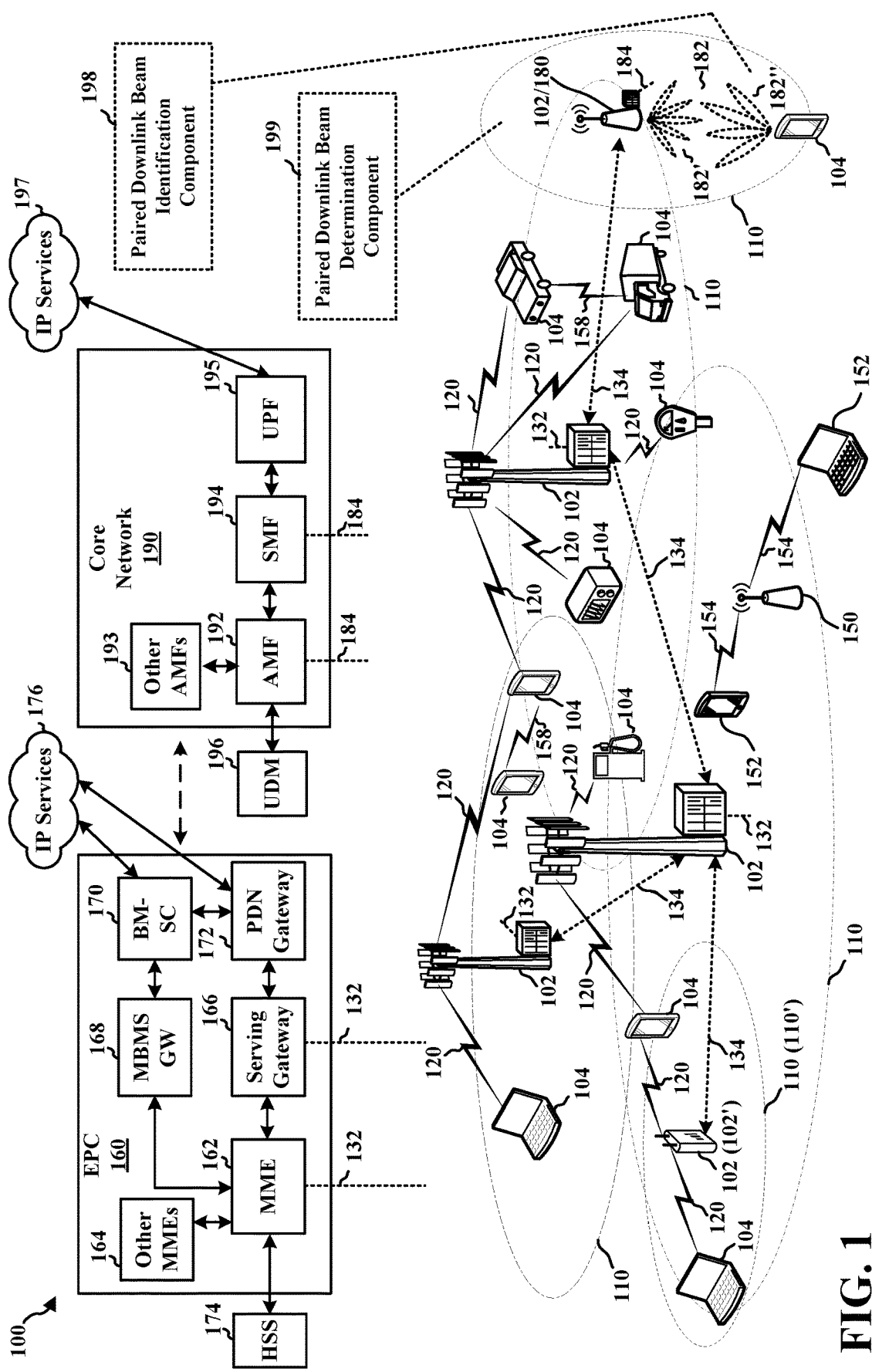
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A UE and/or a base station may communicate in a full-duplex mode in which uplink communication and downlink communication is exchanged in a same frequency band at overlapping times. The UE and/or the base station may exchange communication using one or more directional beams. For example, the UE may be configured (e.g., via a configuration received from the base station) to transmit an uplink control channel (e.g., a physical uplink control channel (PUCCH)) using an uplink beam. Since the base station determines when to transmit a downlink transmission to the UE, the base station may determine when an occurrence of full-duplex communication may occur. In some such instances, the base station may configure the UE to receive a downlink transmission using a downlink beam that is paired to the uplink beam to facilitate full-duplex communication.

Aspects disclosed herein enable configuring a UE to perform full-duplex communication with a base station based on an indication of an uplink beam and a paired downlink beam. For example, the UE may receive an uplink control channel resource configuration indicating an uplink beam for transmitting an uplink control channel. The UE may identify a paired downlink beam for full-duplex reception of a downlink transmission from the base station that overlaps in time with transmission of the uplink control channel.

In a first aspect, the UE may receive downlink control information (DCI) from the base station scheduling the transmission of the uplink control channel and the reception of the downlink transmission. The DCI may indicate the downlink beam paired to the uplink beam for transmitting the uplink control channel through the uplink control channel resource configuration.

In a second aspect, the uplink control channel resource configuration may include an indication of the downlink beam paired to the uplink beam for transmitting the uplink control channel. For example, the uplink control channel resource configuration may include a transmission configuration indicator (TCI) state field and the UE may identify the downlink beam paired with the uplink beam based on the TCI state field. In some examples, the TCI state field may comprise a bi-directional TCI state field indicating the uplink beam for transmitting the uplink control channel and the downlink beam paired to the uplink beam for transmitting the uplink control channel. In some examples, the TCI state field may comprise an uplink TCI state field indicating the uplink beam for transmitting the uplink control channel and a downlink TCI state field indicating the downlink beam paired to the uplink beam for transmitting the uplink control channel.

In a third aspect, the UE may identify the downlink beam paired to the uplink beam for transmitting the uplink control channel based on a reference signal (RS) configuration, a measurement, or a synchronization signal block (SSB). In some examples, the UE may identify the downlink beam paired to the uplink beam for transmitting the uplink control channel based on a beam failure detection (BFD) RS configuration and/or a radio link measurement (RLM) RS configuration. In some examples, the UE may identify the downlink beam paired to the uplink beam for transmitting the uplink control channel based on performing a self-interference measurement (SIM) measurement and/or one or more beam management (BM) measurements. In some examples, the UE may identify the downlink beam paired to the uplink beam for transmitting the uplink control channel based on a downlink SSB that overlaps with random access channel (RACH) occasions.

FIG. 1 is a diagram illustrating an example of a wireless communications system and an access network 100 including base stations 102 and/or 180 and UEs 104.

In some examples, a wireless communication device, such as a UE 104, may be configured to manage one or more aspects of wireless communication by facilitating performing full-duplex communication based on an uplink beam for transmitting an uplink control channel and identifying a downlink beam for full-duplex reception of a downlink transmission that overlaps in time with transmission of the uplink control channel. As an example, in FIG. 1, the UE 104 may include a paired downlink beam identification component 198 configured to receive a PUCCH resource configuration from a base station. The PUCCH resource configuration indicates an uplink beam for transmitting an uplink transmission. The example paired downlink beam identification component 198 may also be configured to identify a downlink beam paired with the uplink beam for transmitting the uplink transmission, the paired downlink beam for full-duplex reception of a downlink transmission from the base station that overlaps in time with transmission of the uplink transmission. The example paired downlink beam identification component 198 may also be configured to perform full-duplex communication with the base station by transmitting the uplink transmission using the uplink beam while receiving the downlink transmission using the paired downlink beam.

Still referring to FIG. 1, in some examples, the base station 102/180 may be configured to manage one or more aspects of wireless communication by facilitating performing full-duplex communication based on an uplink beam for receiving an uplink control channel and determining a downlink beam for full-duplex transmission of a downlink transmission that overlaps in time with reception of the uplink control channel. As an example, in FIG. 1, the base station 102/180 may include a paired downlink beam determination component 199 configured to transmit a PUCCH resource configuration to a UE. The PUCCH resource configuration may indicate an uplink beam for receiving an uplink transmission. The example paired downlink beam determination component 199 may also be configured to determine a downlink beam paired with the uplink beam for receiving the uplink transmission, the paired downlink beam for full-duplex transmission of a downlink transmission to the UE that overlaps in time with reception of the uplink transmission. The example paired downlink beam determination component 199 may also be configured to perform full-duplex communication with the UE by transmitting the downlink transmission using the paired downlink beam while receiving the uplink transmission using the uplink beam.

Although the following description provides examples directed to 5G NR, the concepts described herein may be applicable to other similar areas, such as LTE, LTE-A, CDMA, GSM, and/or other wireless technologies, in which a UE and/or a base station may be capable of full-duplex communication.

The wireless communications system (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
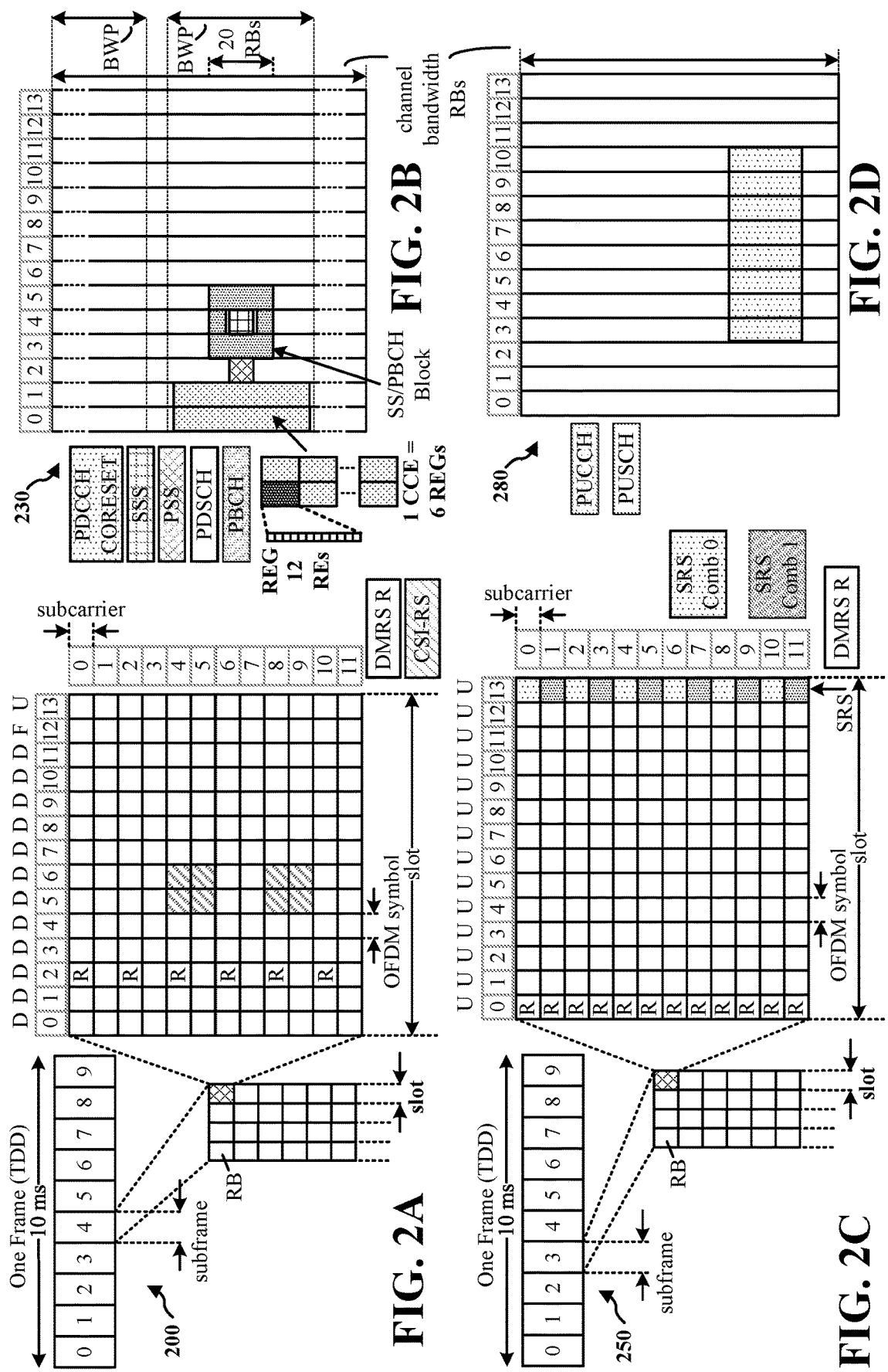
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI- RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
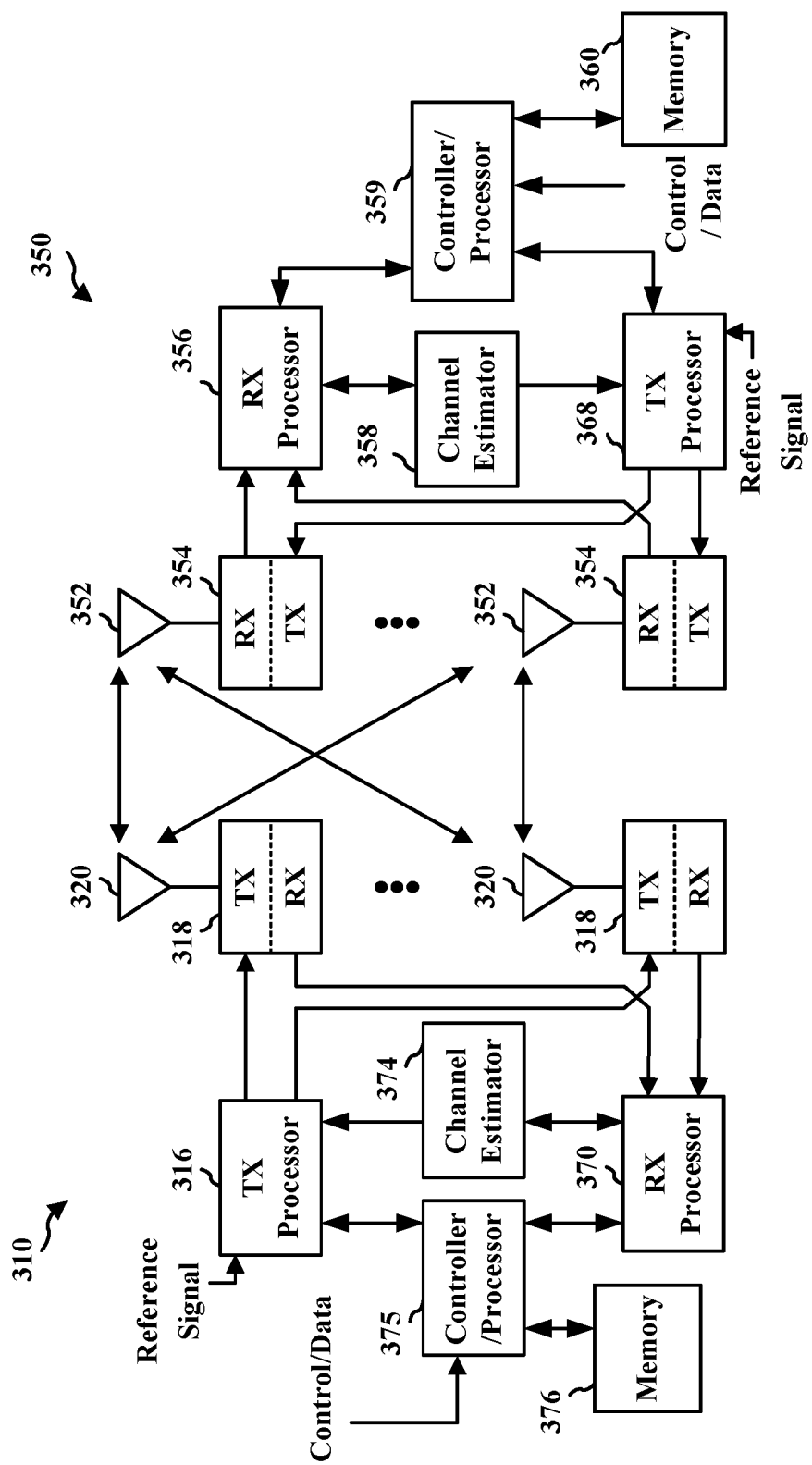
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor (e.g., a TX processor 316) and the receive (RX) processor (e.g., an RX processor 370) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to an RX processor 356. A TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by a channel estimator 358. The soft decisions are then decoded and deinterleaved to recover the data and control signals that were originally transmitted by the base station 310 on the physical channel. The data and control signals are then provided to a controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to the RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the paired downlink beam identification component 198 of FIG. 1.

At least one of the TX processor 316, the RX processor 370, and the controller/processor 375 may be configured to perform aspects in connection with the paired downlink beam determination component 199 of FIG. 1.

Wireless communication systems may be configured to share available system resources and provide various telecommunication services (e.g., telephony, video, data, messaging, broadcasts, etc.) based on multiple-access technologies that support communication with multiple users. Full-duplex operation, in which a wireless device exchanges uplink and downlink communication that overlaps in time, may enable more efficient use of the wireless spectrum. Full-duplex operation may include simultaneous transmission and reception in a same frequency range, partially overlapped frequency range, or separate frequency ranges. In some examples, the frequency range may be a mmW frequency range, e.g., frequency range 2 (FR2). In some examples, the frequency range may be a sub-6 GHz frequency range, e.g., frequency range 1 (FR1). The aspects presented herein may also be applied to other frequency ranges. Full-duplex capability may be supported at a base station and/or a UE. For example, a UE may transmit uplink communication from one antenna panel and may receive downlink communication with another antenna panel. In additional or alternate examples, a base station may transmit to a first UE using a first antenna panel and may receive from a second UE using a second antenna panel. For another example, a base station may transmit to a UE using a first antenna panel and may receive from the same UE using a second antenna panel. In some examples, the full-duplex communication may be conditional on beam or spatial separation or other conditions.

Full-duplex communication may reduce latency. For example, full-duplex operation may enable a UE to receive a downlink signal in an uplink only slot, which can reduce the latency for the downlink communication. Full-duplex communication may improve spectrum efficiency, such as spectrum efficiency per cell or per UE. Full-duplex communication may enable more efficient use of wireless resources.

FIGS. 4A, 4B, and 4C illustrate various modes of full-duplex communication. Full-duplex communication supports transmission and reception of information over a same frequency band, partially overlapped frequency band, or separate frequency bands in a manner that overlaps in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full-duplex communication, a UE or a base station may experience self-interference caused by signal leakage from its local transmitter to its local receiver. In addition, the UE or the base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full-duplex communication 400 in which a first base station 402a is in full-duplex communication with a first UE 404a and a second UE 406a. The first base station 402a is a full-duplex base station, whereas the first UE 404a and the second UE 406a may be configured as either a half-duplex UE or a full-duplex UE. The second UE 406a may transmit a first uplink signal 430a to the first base station 402a as well as to other base stations, such as a second base station 408a in proximity to the second UE 406a. The first base station 402a transmits a downlink signal 432a to the first UE 404a concurrently with receiving the uplink signal 430a from the second UE 406a. The first base station 402a may experience self-interference from the receiving antenna that is receiving the uplink signal 430a from the second UE 406a receiving some of the downlink signal 432a being transmitted to the first UE 404a. The first base station 402a may experience additional interference due to signals from the second base station 408a. Interference may also occur at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the first base station 402b is a full-duplex base station and the first UE 404b is a full-duplex UE. The first base station 402b and the first UE 404b can concurrently receive and transmit communication that overlaps in time in a same frequency band. The first base station 402b and the first UE 404b may each experience self-interference, in which a transmitted signal from the respective device is leaked to a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c is a full-duplex UE in communication with a first base station 402c and a second base station 408c. The first base station 402c and the second base station 408c may serve as multiple transmission and reception points (multi-TRPs) for uplink and downlink communication with the UE first 404c. The second base station 408c may be in communication with a second UE 406c. In FIG. 4C, the first UE 404c may concurrently transmit an uplink signal 430c to the first base station 402c while receiving a downlink signal 432c from the second base station 408c. The first UE 404c may experience self-interference as a result of the first signal and the second signal being communicated simultaneously, e.g., the uplink signal 430c may leak to (e.g., be received by) the receiving antenna of the first UE 404c. The first UE 404c may experience additional interference from the second UE 406c.

Figure 5:
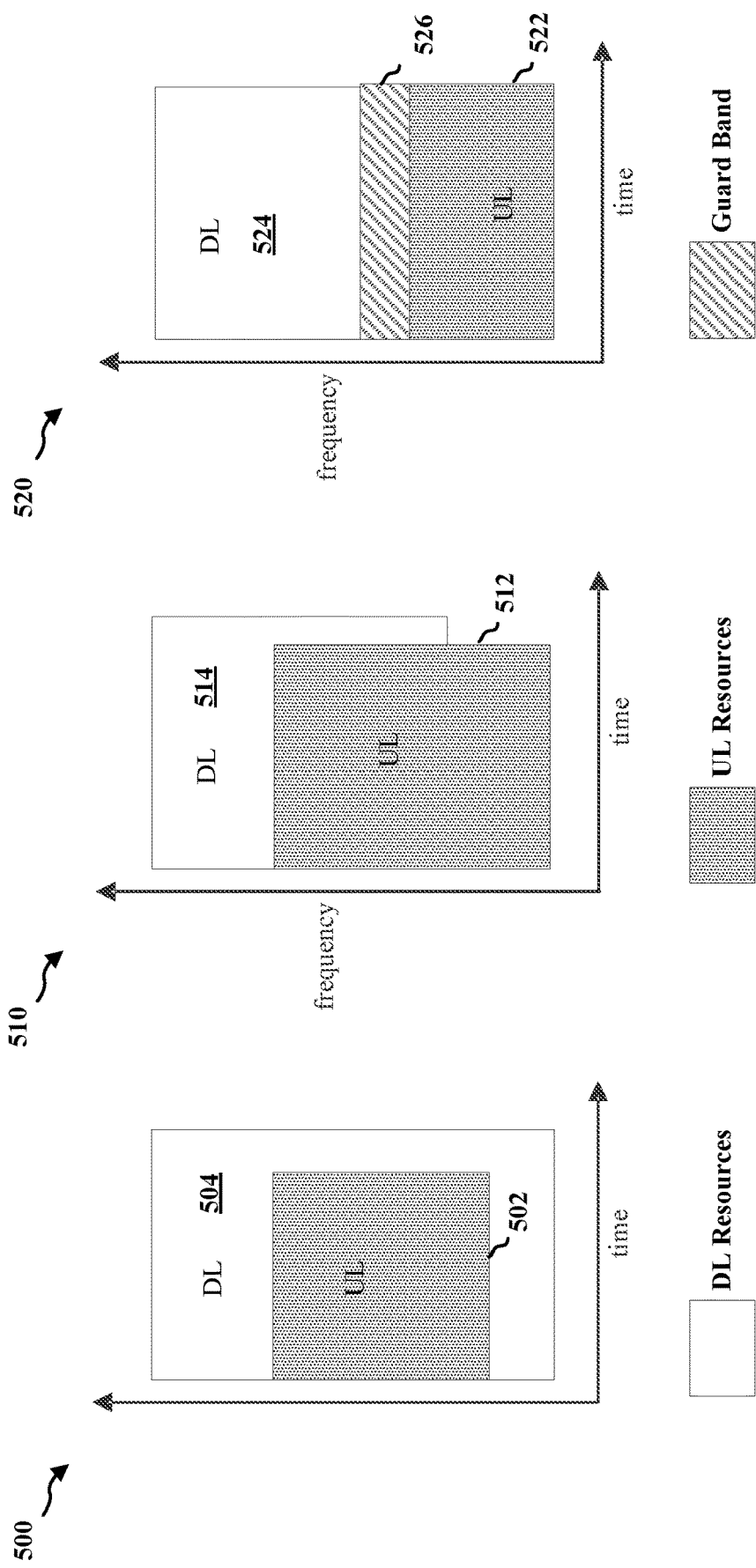
FIG. 5 illustrates examples of in-band full-duplex (IBFD) resources and sub-band frequency division duplex (FDD) resources for full-duplex communication, in accordance with various aspects of the present disclosure.

Full-duplex communication may be in a same frequency band. The uplink and downlink communication may be in different frequency subbands, in the same frequency subband, or in partially overlapping frequency subbands. FIG. 5 illustrates a first example 500 and a second example 510 of in-band full duplex (IBFD) resources and a third example 520 of sub-band full-duplex resources. An uplink communication may be communicated using uplink resources and a downlink communication may be communicated using downlink resources. In IBFD, signals may be transmitted and received in overlapping times and overlapping in frequency. As shown in the first example 500, a time and a frequency allocation of UL resources 502 may fully overlap with a time and a frequency allocation of DL resources 504. In the second example 510, a time and a frequency allocation of UL resources 512 may partially overlap with a time and a frequency allocation of DL resources 514.

IBFD is in contrast to sub-band frequency division duplex (FDD), where uplink and downlink resources may overlap in time using different frequencies, as shown in the third example 520. In the third example 520, UL resources 522 are separated from DL resources 524 by a guard band 526. The guard band 526 may be frequency resources, or a gap in frequency resources, provided between the UL resources 522 and the DL resources 524. Separating the UL frequency resources and the DL frequency resources with a guard band may help to reduce self-interference. UL resources and DL resources that are immediately adjacent to each other correspond to a guard band width of 0. As an output signal (e.g., from a UE transmitter) may extend outside the UL resources, the guard band may reduce interference experienced by the UE. Sub-band FDD may also be referred to as "flexible duplex."

In some examples, a UE may be configured with an uplink control channel resource (e.g., a PUCCH resource) to use for transmitting uplink control information. For example, a base station may transmit a physical uplink control channel resource configuration (e.g., a PUCCH-Config parameter) that is received by the UE and configures the PUCCH resource. The PUCCH resource may be used to transfer uplink control information, such as HARQ feedback, scheduling requests, link recovery requests, and/or periodic and semi-periodic CSI reports.

The PUCCH resource may be associated with a PUCCH resource index (e.g., a PUCCH-ResourceID parameter), an index of a first PRB prior to frequency hopping or for no frequency hopping (e.g., a startingPRB parameter), an index of the first PRB after frequency hopping (e.g., a secondHopPRB parameter), an indication for intra-slot frequency hopping (e.g., a intraSlotFrequencyHopping parameter), an index of a first interlace (e.g., an interlace0 parameter), an index of a second interlace (e.g., an interlace1 parameter), an index of an RB set (e.g., an rb-SetIndex parameter), and/or a configuration for a PUCCH format (e.g., a format parameter). The PUCCH resource configuration may also associate the PUCCH resource with spatial settings (e.g., a PUCCH-SpatialRelationInfo parameter). For example, the PUCCH resource configuration may indicate an uplink beam for transmitting the uplink control information.

Figure 6:
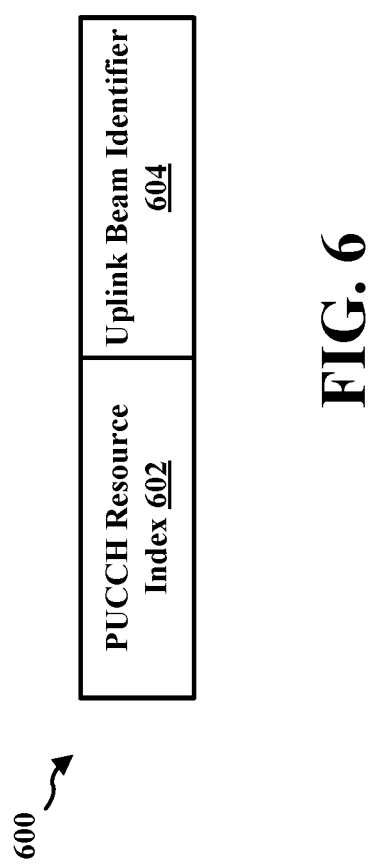
FIG. 6 illustrates an example PUCCH resource configuration including a PUCCH resource index and an uplink beam identifier, in accordance with various aspects of the present disclosure.

FIG. 6 depicts an example PUCCH resource configuration 600 including a PUCCH resource index 602 and an uplink beam identifier 604, as presented herein. The example PUCCH resource index 602 (e.g., a PUCCH-ResourceID parameter) identifies a PUCCH resource. The example uplink beam identifier 604 (e.g., a PUCCH-SpatialRelationInfo parameter) identifies spatial settings for a beam associated with the PUCCH resource (e.g., the uplink beam for transmitting uplink control information). A base station, such as the base station 102/180 of FIG. 1, may transmit the PUCCH resource configuration 600 to a UE, such as the UE 104 of FIG. 1, via RRC signaling. Although the example PUCCH resource configuration 600 includes the PUCCH resource index 602 and the uplink beam identifier 604, other examples may include additional or alternative parameters.

When employing half-duplex communication, a wireless device such as a UE transmits or receives in one direction at a time without overlapping uplink and downlink communication in a frequency range. For example, to transmit uplink control information, the UE may receive a PUCCH resource configuration configuring a PUCCH resource and indicating an associated uplink beam for transmitting the uplink control information. Additionally, or alternatively, to receive a downlink communication, the UE may receive a downlink transmission resource configuration configuring downlink resources and indicating an associated downlink beam for receiving the downlink communication. In such instances, the uplink communication and the downlink communication do not overlap in time and, thus, the uplink beam for transmitting the uplink control information and the downlink beam for receiving the downlink communication may be independently configured. That is, because transmission or reception of information is performed in one direction at a time in half-duplex communication, the beam selected for the uplink communication and the beam selected for the downlink communication may or may not be related. For example, the uplink beam and the downlink beam may be the same beam or may be different beams.

However, when performing full-duplex communication, the UE exchanges uplink and downlink communication that overlaps in time. In such instances, the uplink beam for transmitting the uplink communication and the downlink beam for transmitting the downlink communication may not be the same beam. Instead, when employing full-duplex communication, the uplink beam and the downlink beam may be paired. The beam pair may be based, at least in part, on interference that an uplink transmission on the uplink beam may cause to downlink reception on the downlink beam. The beam pair may be selected based on signal strength and self-interference, e.g., an SINR beam pair that has a highest signal strength and a low self-interference among beam pair candidates. In contrast, a half-duplex beam may be selected based on having a highest signal strength or RSRP among a set of candidate beams, e.g., without consideration of potential self-interference. When scheduling a UE to transmit uplink control information, a base station may transmit a PUCCH resource configuration scheduling the UE to transmit uplink control information at a time (e.g. a slot X) using an uplink beam. The base station may also indicate to the UE that, at the indicated time (e.g., at the slot X), the UE will receive a downlink transmission from the base station. To perform full-duplex communication, the UE may identify a downlink beam for full-duplex reception of the downlink transmission. The downlink beam may be paired with the uplink beam for transmitting the uplink control information.

Figure 7A:
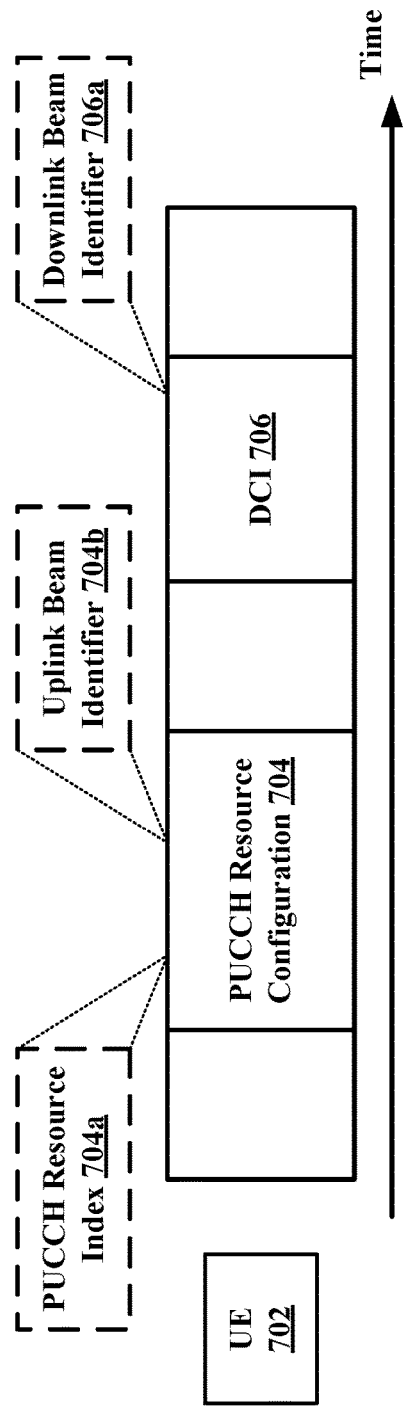
FIG. 7A illustrates an example of UE reception of a PUCCH resource configuration and a DCI scheduling an uplink transmission and a downlink transmission for full-duplex communication, in accordance with various aspects of the present disclosure.

In a first aspect, the UE may receive downlink control information (DCI) from the base station scheduling the transmission of uplink control information and the reception of a downlink transmission (e.g., a CORESET). For example, FIG. 7A illustrates an example 700 of a UE 702 that receives a PUCCH resource configuration 704 and DCI 706. Aspects of the PUCCH resource configuration 704 may be similar to the PUCCH resource configuration 600 of FIG. 6. For example, the PUCCH resource configuration 704 may include a PUCCH resource index 704a identifying a PUCCH resource and an uplink beam identifier 704b identifying an uplink beam associated with the PUCCH resource for transmitting the uplink control information. The UE 702 may receive the PUCCH resource configuration 704 via RRC signaling. The UE 702 may transmit uplink control information using the uplink beam identified by the uplink beam identifier 704b.

To perform full-duplex communication, the base station may transmit DCI 706 that is received by the UE 702. The DCI 706 may schedule full-duplex communication by scheduling an uplink transmission of the uplink control information at a time (e.g., a slot X) that overlaps in time with reception of a downlink transmission by the UE 702, such as described in connection with FIGS. 4A to 5. As shown in FIG. 7A, the DCI 706 may include a downlink beam identifier 706a indicating a downlink beam for full-duplex reception of the downlink transmission. The indicated downlink beam may be paired with the uplink beam for transmitting the uplink control information (e.g., the uplink beam indicated by the uplink beam identifier 704b).

Figure 7B:
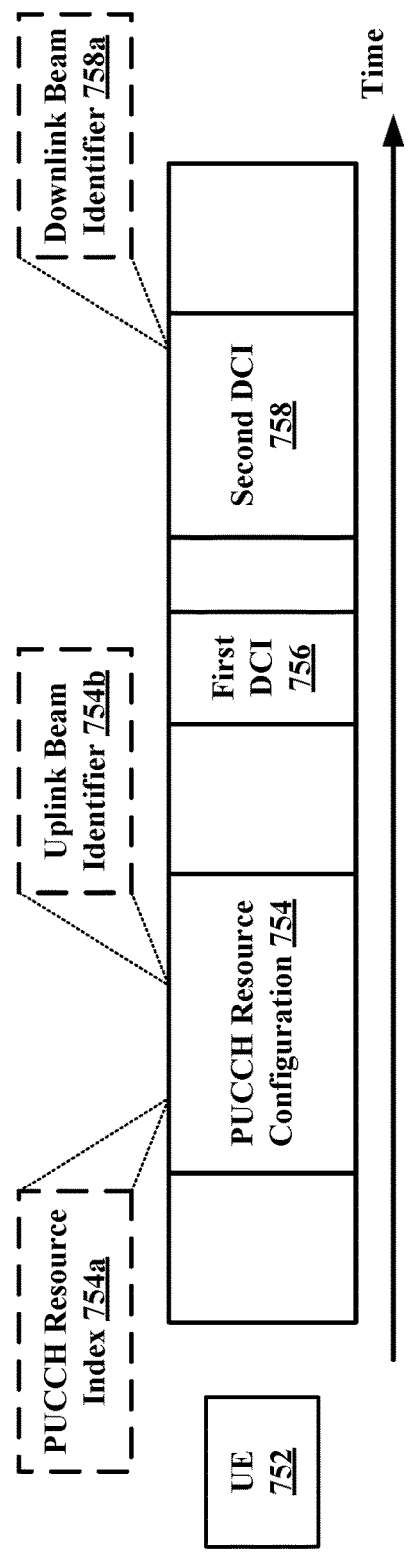
FIG. 7B illustrates an example of UE reception of a PUCCH resource configuration, a first DCI scheduling an uplink transmission, and a second DCI scheduling a downlink transmission for full-duplex communication, in accordance with various aspects of the present disclosure.

In the illustrated example of FIG. 7A, a single DCI (e.g., the DCI 706) schedules the uplink transmission and the downlink transmission. In some examples, different DCI may schedule uplink transmission and the downlink transmission. For example, FIG. 7B illustrates an example 750 in which a UE 752 a PUCCH resource configuration 754, a first DCI 756, and a second DCI 758. Aspects of the PUCCH resource configuration 754 may be similar to the PUCCH resource configuration 600 of FIG. 6. For example, the PUCCH resource configuration 754 may include a PUCCH resource index 754a identifying a PUCCH resource and an uplink beam identifier 754b identifying an uplink beam associated with the PUCCH resource for transmitting the uplink control information. The UE 752 may receive the PUCCH resource configuration 754 via RRC signaling. The UE 752 may transmit uplink control information using the uplink beam identified by the uplink beam identifier 754b.

To perform full-duplex communication in the illustrated example of FIG. 7B, the base station may transmit the first DCI 756 and the second DCI 758 that is received by the UE 752. The first DCI 756 may schedule a first transmission in a first direction at a time and the second DCI 758 may schedule a second transmission in a second direction at a time overlapping with the first transmission. For example, the first DCI 756 may schedule an uplink transmission of the uplink control information at a time (e.g., a slot X). The second DCI 758 may schedule full-duplex reception of a downlink transmission from the base station that overlaps in time with the transmission of the uplink control information (e.g., at the slot X). As shown in FIG. 7B, the second DCI 758 may include a downlink beam identifier 758a indicating a downlink beam for full-duplex reception of the downlink transmission. The indicated downlink beam may be paired with the uplink beam for transmitting the uplink control information (e.g., the uplink beam indicated by the uplink beam identifier 754b).

In a second aspect, to facilitate identifying the downlink beam paired to the uplink beam for transmitting an uplink control channel, the PUCCH resource configuration may include an indication of the downlink beam paired to the uplink beam for transmitting the uplink control information. For example, the PUCCH resource configuration may include a TCI state field and the UE may identify the downlink beam paired with the uplink beam based on the TCI state field.

Figure 8A:
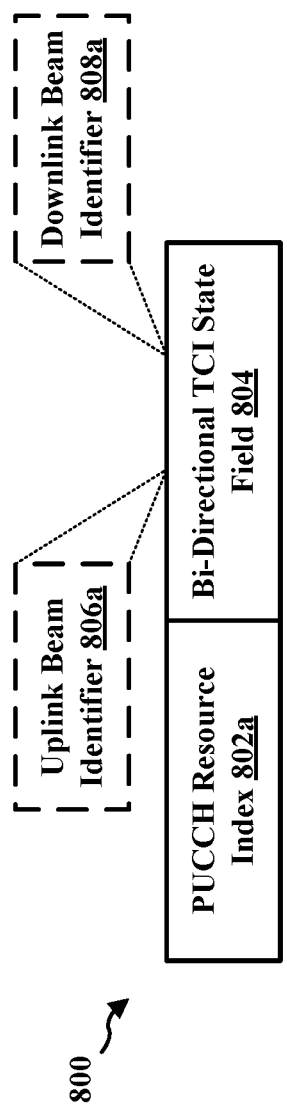
FIG. 8A illustrates an example PUCCH resource configuration including a PUCCH resource index and a bi-directional transmission configuration indication (TCI) state field, in accordance with various aspects of the present disclosure.
Figure 8B:
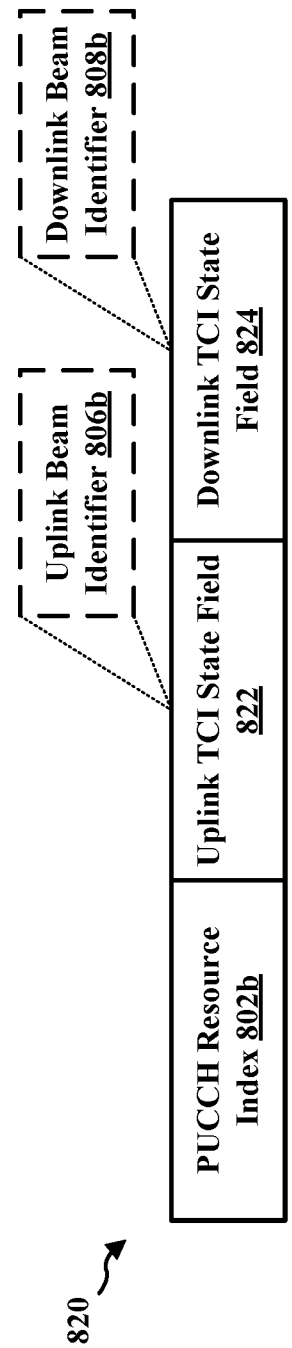
FIG. 8B illustrates an example PUCCH resource configuration including a PUCCH resource index, an uplink TCI state field, and a downlink TCI state field, in accordance with various aspects of the present disclosure.

FIGS. 8A and 8B illustrate examples of a PUCCH resource configuration including a PUCCH resource index and a TCI state field that identifies the paired downlink beam. For example, FIG. 8A illustrates an example PUCCH resource configuration 800 including a PUCCH resource index 802a and a bi-directional TCI state field 804, as presented herein. The example PUCCH resource index 802a identifies a PUCCH resource. The example bi-directional TCI state field 804 includes an uplink beam identifier 806a identifying an uplink beam associated with the PUCCH resource (e.g., the uplink beam for transmitting uplink control information associated with the PUCCH resource). The example bi-directional TCI state field 804 of FIG. 8A also includes a downlink beam identifier 808a identifying a downlink beam for full-duplex reception of a downlink transmission. The identified downlink beam may be paired with the uplink beam for transmitting the uplink control information.

A base station, such as the base station 102/180 of FIG. 1, may transmit the PUCCH resource configuration 800 to a UE, such as the UE 104 of FIG. 1, via RRC signaling. Although the example PUCCH resource configuration 800 includes the PUCCH resource index 802a and the bi-directional TCI state field 804, other examples may include additional or alternative parameters.

In some examples, the PUCCH resource configuration may include two single-direction TCI state fields. For example, FIG. 8B illustrates an example PUCCH resource configuration 820 including a PUCCH resource index 802b, an uplink TCI state field 822, and a downlink TCI state field 824, as presented herein. Aspects of the PUCCH resource index 802b may be similar to the PUCCH resource index 602 of FIG. 6 and/or the PUCCH resource index 802a of FIG. 8A. The example uplink TCI state field 822 includes an uplink beam identifier 806b identifying an uplink beam associated with the PUCCH resource (e.g., the uplink beam for transmitting uplink control information associated with the PUCCH resource identified by the PUCCH resource index 802b). The example downlink TCI state field 824 includes a downlink beam identifier 808b identifying a downlink beam for full-duplex reception of a downlink transmission. The identified downlink beam may be paired with the uplink beam for transmitting the uplink control information.

A base station, such as the base station 102/180 of FIG. 1, may transmit the PUCCH resource configuration 820 to a UE, such as the UE 104 of FIG. 1, via RRC signaling. Although the example PUCCH resource configuration 820 includes the PUCCH resource index 802b, the uplink TCI state field 822, and the downlink TCI state field 824, other examples may include additional or alternative parameters.

In the illustrated examples of FIGS. 8A and 8B, the UE may identify the downlink beam paired with the uplink beam for transmitting the uplink control information based on the downlink beam identifier 808a, 808b included in the respective PUCCH resource configuration 800, 820. A PUCCH resource configuration that indicates the uplink beam for transmitting the uplink control information and the downlink beam paired with the uplink beam (e.g., as shown in the examples of FIGS. 8A and 8B) may be beneficial for reducing overhead signaling.

In some examples, the UE may be performing communication in a first direction and receive scheduling information (e.g., DCI) scheduling an occurrence of communication in a second direction that overlaps with communication in the first direction. In some such examples, the UE may switch to the downlink beam indicated by the downlink beam identifier 808a, 808b of the respective PUCCH resource configuration 800, 820 for receiving the downlink transmissions that overlap in time.

Figure 9A:
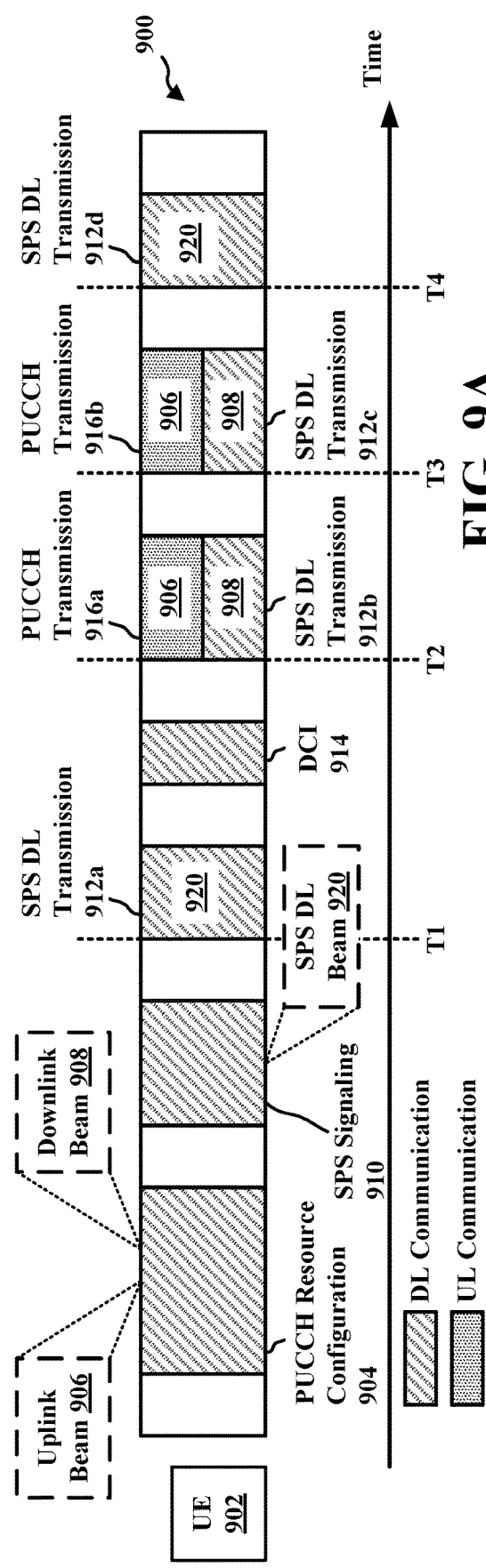
FIG. 9A illustrates an example of a UE that receives scheduling information scheduling semi-persistent scheduling (SPS) transmissions and subsequently receives scheduling information scheduling PUCCH transmissions that overlaps with at least one occurrence of an SPS transmission, in accordance with various aspects of the present disclosure.

FIG. 9A illustrates an example 900 of a UE 902 that receives scheduling information scheduling semi-persistent scheduling (SPS) transmissions and subsequently receives scheduling information scheduling PUCCH transmissions that overlaps with at least one occurrence of an SPS transmission, as presented herein. For example, the UE 902 may receive a PUCCH resource configuration 904 including an identifier identifying an uplink beam 906 for transmitting an uplink control channel and an identifier identifying a downlink beam 908 paired with the uplink beam 906. In some examples, aspects of the PUCCH resource configuration 904 may be similar to the PUCCH resource configuration 800 of FIG. 8A including the PUCCH resource index 802a and the bi-directional TCI state field 804 indicating the uplink beam 906 and the paired downlink beam 908. In some examples, aspects of the PUCCH resource configuration 904 may be similar to the PUCCH resource configuration 820 of FIG. 8B including the PUCCH resource index 802b, the uplink TCI state field indicating the uplink beam 906, and the downlink TCI state field 824 indicating the downlink beam 908 paired with the uplink beam 906.

As shown in FIG. 9A, the UE 902 may receive SPS signaling 910 scheduling SPS downlink transmissions. For example, the SPS signaling 910 may schedule a first SPS downlink transmission 912a at a first time (T1), may schedule a second SPS downlink transmission 912b at a second time (T2), may schedule a third SPS downlink transmission 912c at a third time (T3), and may schedule a fourth SPS downlink transmission 912d at a fourth time (T4). In the illustrated example, the SPS signaling 910 includes an identifier identifying an SPS downlink beam 920 for receiving the SPS downlink transmissions 912a, 912b, 912c, 912d. For example, at the first time (T1), the UE 902 may receive the first SPS downlink transmission 912a using the SPS downlink beam 920. In the example 900 of FIG. 9A, the SPS downlink beam 920 and the downlink beam 908 are different beams. However, it may be appreciated that in other examples, the SPS downlink beam 920 and the downlink beam 908 may be a same beam.

As shown in FIG. 9A, after receiving the SPS signaling 910, the UE 902 may receive DCI 914. The DCI 914 may schedule one or more PUCCH transmissions based on the PUCCH resource configuration 904. For example, in the example 900 of FIG. 9A, the DCI 914 schedules a first PUCCH transmission 916a at the second time (T2) and a second PUCCH transmission 916b at the third time (T3).

In the illustrated example 900 of FIG. 9A, the UE 902 is scheduled to perform full-duplex communication at the second time (T2) and the third time (T3). For example, at the second time (T2), the UE 902 is scheduled to transmit the first PUCCH transmission 916a and to receive the second SPS downlink transmission 912b. In some examples in which an occurrence of PUCCH transmission is scheduled to overlap in time with an SPS downlink transmission (e.g., at the second time (T2) and the third time (T3)), the UE 902 may switch the beam used to receive the SPS downlink transmission from the SPS downlink beam 920 to the downlink beam 908 identified by the PUCCH resource configuration 904. For example, at the second time (T2), the UE 902 may use the uplink beam 906 for transmitting the first PUCCH transmission 916a and may use the downlink beam 908 for full-duplex reception of the second SPS downlink transmission 912b. In a similar manner, at the third time (T3), the UE 902 may use the uplink beam 906 for transmitting the second PUCCH transmission 916b and may use the downlink beam 908 for full-duplex reception of the third SPS downlink transmission 912c.

As shown in FIG. 9A, the UE 902 may receive the fourth SPS downlink transmission 912d using the SPS downlink beam 920. For example, at the fourth time (T4), the UE 902 is not scheduled to perform full-duplex communication and, thus, the UE 902 may switch back (or reset) the beam used to receive the fourth SPS downlink transmission 912d from the downlink beam 908 indicated by the PUCCH resource configuration 904 to the SPS downlink beam 920 indicated by the SPS signaling 910. That is, in the example 900 of FIG. 9A, the UE 902 may use the downlink beam 908 indicated by the PUCCH resource configuration 904 for occurrences of SPS downlink transmissions that overlap in time with PUCCH transmissions (e.g., at the second time (T2) and the third time (T3)). In such examples, the UE 902 may use the SPS downlink beam 920 indicated by the SPS signaling 910 for occurrences of SPS downlink transmissions that do not overlap in time PUCCH transmissions (e.g., at the first time (T1) and the fourth time (T4)).

However, it may be appreciated that in other examples, after an occurrence of communications overlapping in time is scheduled (e.g., via the DCI 914), the UE 902 may continue using the downlink beam 908 indicated by the PUCCH resource configuration 904 to receive SPS downlink transmissions even when the SPS downlink transmissions does not overlap with a PUCCH transmission. For example, in such examples, the UE 902 may receive the first SPS downlink transmission 912a at the first time (T1) using the SPS downlink beam 920, and may use the downlink beam 908 to receive the second SPS downlink transmission 912b at the second time (T2), the third SPS downlink transmission 912c at the third time (T3), and the fourth SPS downlink transmission 912d at the fourth time (T4).

Figure 9B:
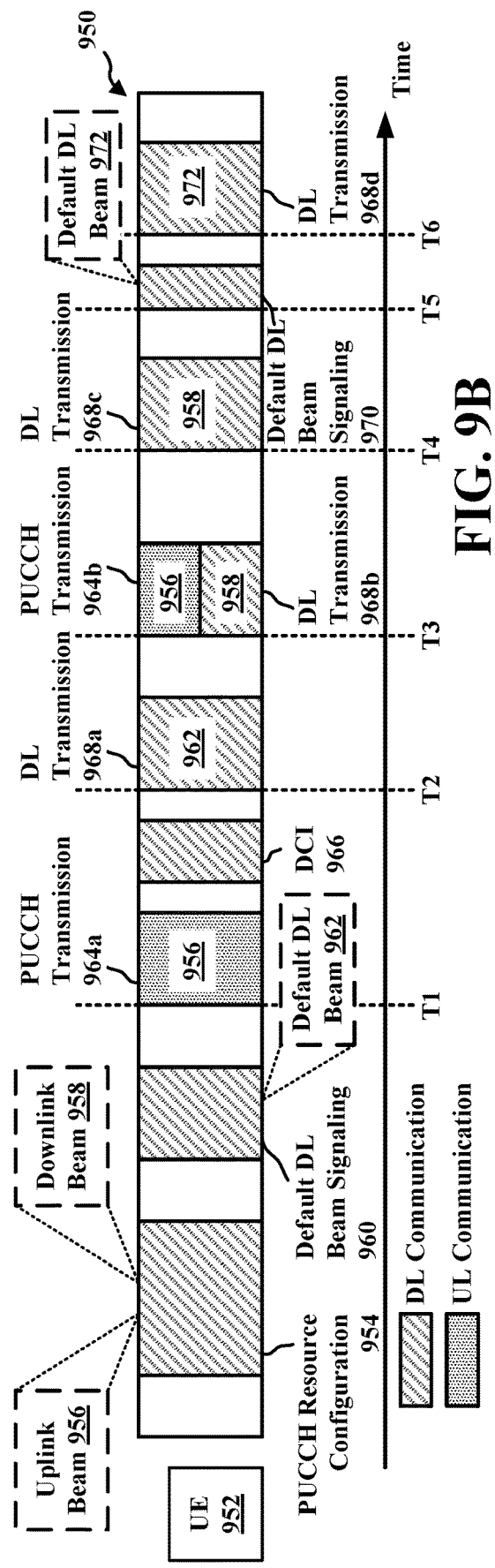
FIG. 9B illustrates an example of a UE that is scheduled with on-going PUCCH transmissions and subsequently receives scheduling information scheduling reception of one or more downlink transmissions that overlaps with at least one occurrence of an on-going PUCCH transmission, in accordance with various aspects of the present disclosure.

FIG. 9B illustrates an example 950 of a UE 952 that is scheduled with on-going PUCCH transmissions and subsequently receives scheduling information scheduling reception of one or more downlink transmissions that overlaps with at least one occurrence of an on-going PUCCH transmission, as presented herein. For example, the UE 952 may receive a PUCCH resource configuration 954 including an identifier identifying an uplink beam 956 for transmitting an uplink control channel and an identifier identifying a downlink beam 958 paired with the uplink beam 956. In some examples, aspects of the PUCCH resource configuration 954 may be similar to the PUCCH resource configuration 800 of FIG. 8A including the PUCCH resource index 802a and the bi-directional TCI state field 804 indicating the uplink beam 956 and the paired downlink beam 958. In some examples, aspects of the PUCCH resource configuration 954 may be similar to the PUCCH resource configuration 820 of FIG. 8B including the PUCCH resource index 802b, the uplink TCI state field indicating the uplink beam 956, and the downlink TCI state field 824 indicating the downlink beam 958 paired with the uplink beam 956.

As shown in FIG. 9B, the UE 952 may receive default downlink beam signaling 960 configuring a default downlink beam 962. In some examples, the UE 952 may use the default downlink beam 962, for example, to receive a downlink transmission after the UE 952 receives an initial higher layer configuration of TCI states, but before an activation command for the TCI states.

In some examples, the UE 952 may use the default downlink beam 962 to receive a downlink transmission when, for example, a downlink channel (e.g., PDCCH or PDSCH) and/or a downlink reference signal is not configured with a beam indication. For example, one or more downlink channels and/or downlink reference signals associated with a TCI and/or beam may not be configured with a beam indication or may not have a TCI field present.

In some examples, the UE 952 may use the default downlink beam 962 to receive a downlink transmission when, for example, reception of the downlink transmission is scheduled for a time that is offset by an interval less than a beam switch latency threshold (e.g., a beamSwitchingTiming parameter). For example, the downlink transmission may comprise a downlink data channel (e.g., PDSCH), an aperiodic CSI-RS beam with scheduling, or a CSI-RS triggering offset that is less than the beam switch latency threshold.

In some examples, the UE 952 may use the default downlink beam 962 to receive a downlink transmission when, for example, a beam update command has been received, transmitted, or acknowledged, but not been applied. For example, the downlink transmission may arrive during a period (e.g., X milliseconds) after the beam update command is received, transmitted, or acknowledged, but before the beam update is applied. In some examples, the beam update command may be received via RRC signaling, DCI, or a medium access control (MAC) control element (MAC-CE).

As shown in FIG. 9B, the UE 952 is scheduled to transmit a first PUCCH transmission 964a at a first time (T1) and to transmit a second PUCCH transmission 964b at a later time (T3). The UE 952 may use the uplink beam 956 for transmitting the first PUCCH transmission 964a and for transmitting the second PUCCH transmission 964b.

In the illustrated example 950 of FIG. 9B, after receiving the PUCCH resource configuration 954 and the default downlink beam signaling 960, the UE 952 may receive DCI 966. The DCI 914 may schedule one or more downlink transmissions from a base station. For example, in the example 950 of FIG. 9B, the DCI 966 may schedule a first downlink transmission 968a at a second time (T2), a second downlink transmission 968b at the third time (T3), a third downlink transmission 968c at a fourth time (T4), and a fourth downlink transmission 968d at a time (T6).

The UE 952 may receive the first downlink transmission 968a at the second time (T2) using the default downlink beam 962. In the illustrated example 950 of FIG. 9B, the UE 952 is scheduled to perform full-duplex communication at the third time (T3). For example, at the third time (T3), the UE 952 is scheduled to transmit the second PUCCH transmission 964b and to receive the second downlink transmission 968b. In some examples in which an occurrence of an on-going PUCCH transmission is scheduled to overlap in time with a downlink transmission (e.g., at the third time (T3)), the UE 952 may switch the beam used to receive the downlink transmission from the default downlink beam signaling 960 to the downlink beam 958 indicated by the PUCCH resource configuration 954. That is, the UE 952 may replace the default downlink beam with the spatial settings associated with the downlink beam 958 indicated by the PUCCH resource configuration 954. For example, at the third time (T3), the UE 952 may use the uplink beam 956 for transmitting the second PUCCH transmission 96bn and may use the downlink beam 958 for full-duplex reception of the second downlink transmission 968b.

In some examples, after the UE 952 switches the default downlink beam to the spatial settings associated with the downlink beam 958 indicated by the PUCCH resource configuration 954, the UE 952 may continue using the downlink beam 958 indicated by the PUCCH resource configuration 904 to receive downlink transmissions. For example, in such examples, the UE 952 may receive the third downlink transmission 968c using the downlink beam 958 at the fourth time (T4).

In some examples, the UE 952 may continue using the downlink beam 958 for the default downlink beam until the UE 952 receives signaling (e.g., from the base station) to reset (or switch) the spatial settings of the default downlink beam. For example, at a fifth time (T5), the UE 952 may receive default downlink beam signaling 970 including an identifier identifying a default downlink beam 972. In some such examples, the UE 952 may use the downlink beam 958 as the default downlink beam for receiving respective downlink transmissions after switching the default downlink beam to the spatial settings associated with the downlink beam 958 and until the default downlink beam signaling 970 is received. For example, in the example 950 of FIG. 9B, the UE 952 may use the downlink beam 958 as the default downlink beam for receiving one or more downlink transmissions received after the third time (T3) and before the fifth time (T5). As shown in FIG. 9B, after receiving the default downlink beam signaling 970, the UE 952 may use the default downlink beam 972 to receive corresponding downlink transmission(s). For example, the UE 952 may receive the fourth downlink transmission 968d using the default downlink beam 972 at the sixth time (T6).

In a third aspect, the UE may identify the downlink beam paired to the uplink beam for transmitting the uplink control channel based on a reference signal (RS) configuration, a measurement, or a synchronization signal block (SSB). For example, the downlink beam may be based on an implicit indication rather than an explicit indication of the paired downlink beam).

In some examples, a UE may identify the downlink beam paired to the uplink beam for transmitting the uplink control channel based on information in a beam failure detection (BFD)/radio link measurement (RLM) reference signal configuration. In some examples, the UE may identify the downlink beam paired to the uplink beam for transmitting the uplink control channel based on performing a self-interference measurement (SIM) measurement and/or one or more beam management (BM) measurements. In some examples, the UE may identify the downlink beam paired to the uplink beam for transmitting the uplink control channel based on a downlink SSB that overlaps with random access channel (RACH) occasions.

For example, a UE may need to monitor the quality of the beams that it uses for communication with a base station. For example, a UE may monitor a quality of a signal received via reception beam(s). A Beam Failure Detection (BFD) procedure may be used to identify problems in beam quality and a Beam Failure Recovery (BFR) procedure may be used when a beam failure is detected. For monitoring active link performances, a UE may perform measurements of at least one signal, e.g., reference signals, for beam failure detection. For example, the base station may transmit channel measurement resource (CMR) reference signals configuring CMRs and interference measurement resource (IMR) reference signals configuring IMRs for self-interference measurements for full duplex communication.

The measurements may include deriving a metric similar to a Signal to Interference plus Noise Ratio (SINR) for the signal, or RSRP strength or block error rate (BLER) of a reference control channel chosen by base station and/or implicitly derived by UE based on the existing RRC configuration (e.g., based on the PUCCH resource configuration). The reference signal may comprise any of CSI-RS, Physical Broadcast Channel (PBCH), a synchronization signal, or other reference signals for time and/or frequency tracking, etc. In some cases, the UE may determine a configured metric such as BLER for a reference signal. The measurement(s) may indicate the UE's ability to transmit an uplink transmission to the base station using the beam.

In some examples, the UE and the base station may use beamforming with at least one active downlink and uplink beam pair for full-duplex communication. As beam conditions may change, the UE may continue to perform measurements, e.g., Layer 1 beam management. For full-duplex communication, the UE may perform measurements for one or more beam pairs, e.g., a pair of an uplink beam for transmitting uplink communication and a downlink beam for receiving downlink communication in a full duplex manner. The UE may perform measurements based on one or more DL and UL reference signals for each beam, e.g., CSI-RS or SSB for a downlink beam and a self-interference measurement (SIM) based on SRS transmitting from the uplink beam. The base station may transmit channel measurement resource (CMR) reference signals configuring CMRs and interference measurement resources (IMRs) to perform, for example, signal to interference and noise ratio (SINR) measurements. The CMRs measure the downlink channel quality and the IMRs measure the self-interference from the uplink beam to its own downlink beam at the UE. With the CMRs and the IMRs, the UE measures the SINR values per uplink and downlink beam pair. The UE may perform measurements for each possible combination of beams, e.g., each candidate beam pair. In some examples, the UE may report measurements to the base station for a set of one or more candidate beam pair combinations for full-duplex communication having the best SINR values based on the channel and self-interference measurements. For example, the UE may report the top N best full-duplex candidate beam pairs that have the highest SINR values, N being an integer number. N may be configured by the base station or may be a defined number. The report may be referred to as a beam management report.

In some examples, the UE may identify the downlink beam paired with the uplink beam for transmitting the uplink control channel based on information in a BFD/RLM reference signal configuration. For example, the BFD/RLM reference signal configuration may include a downlink beam in a CMR reference signal configuration paired with the uplink beam associated with the PUCCH resource configuration (e.g., the uplink beam indicated by the uplink beam identifier 604 of the PUCCH resource configuration 600 of FIG. 6).

In some examples, the UE may identify the downlink beam paired with the uplink beam for transmitting the uplink control channel based on the downlink beam of the candidate beam pair combinations having the best SINR value. For example, the candidate beam pair combinations may include different combinations of downlink beams paired with the uplink beam indicated in the PUCCH resource configuration (e.g., the uplink beam indicated by the uplink beam identifier 604 of the PUCCH resource configuration 600 of FIG. 6).

In some examples, if there are overlapping RACH occasions with downlink SSBs in a full-duplex mode, the UE may identify the downlink beam paired with the uplink beam for transmitting the uplink control channel based on the downlink SSB that overlaps with the RACH occasion in which the beam for transmitting the RACH occasion is the same as the uplink beam for transmitting the uplink control channel. That is, the UE may identify the paired downlink beam based on the RACH preamble beam. For example, the UE identify the RACH preamble beam that is the same as the uplink beam indicated in the PUCCH resource configuration for transmitting the uplink control channel. The UE may use the downlink SSB corresponding to the identified RACH preamble beam to identify (or set) the downlink beam that pairs with the uplink beam for transmitting the uplink control channel.

Figure 10:
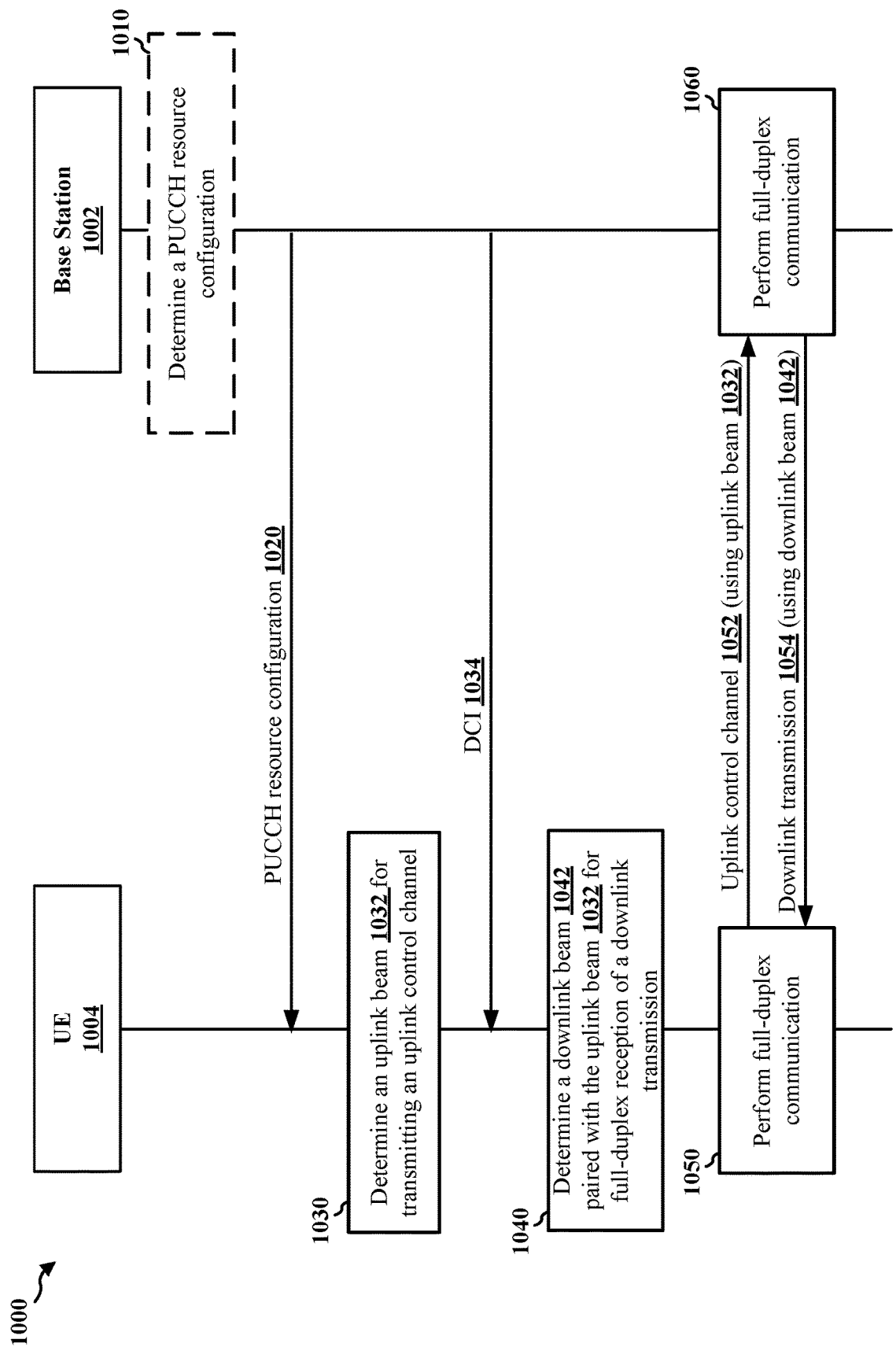
FIG. 10 is an example communication flow between a base station and a UE, in accordance with the teachings disclosed herein.

FIG. 10 illustrates an example communication flow 1000 between a base station 1002 and a UE 1004, as presented herein. In the illustrated example, the communication flow 1000 facilitates the UE 1004 identifying a downlink beam paired with an uplink beam for performing full-duplex communication. Aspects of the base station 1002 may be implemented by the base station 102/180, the base station 310, and/or the first base station 402a, 402b. Aspects of the UE 1004 may be implemented by the UE 104, the UE 350, the first UE 404b, 404c, the UE 702, the UE 752, the UE 902, and/or the UE 952. Although not shown in the illustrated example of FIG. 10, it may be appreciated that in additional or alternative examples, the base station 1002 may be in communication with one or more other base stations or UEs, and/or the UE 1004 may be in communication with one or more other base stations or UEs.

At 1010, the base station 1002 may determine a PUCCH resource configuration for configuring a PUCCH resource at the UE 1004. For example, the base station 1002 may determine a PUCCH resource configuration 1020 including a PUCCH resource index and spatial relation information for an uplink beam for transmitting an uplink control channel (e.g., PUCCH). In some examples, the base station 1002 may determine the downlink beam paired with the uplink beam for receiving the uplink control channel from the UE 1004.

The base station 1002 transmits the PUCCH resource configuration 1020 that is received by the UE 1004. The base station 1002 may transmit the PUCCH resource configuration 1020 via RRC signaling. The PUCCH resource configuration 1020 may include a PUCCH resource index identifying a PUCCH resource and an uplink beam identifier identifying an uplink beam for transmitting an uplink control channel.

At 1030, the UE 1004 may determine an uplink beam for transmitting an uplink control channel. For example, the UE 1004 may decode the PUCCH resource configuration 1020 to determine an uplink beam 1032 for transmitting the uplink control channel to the base station 1002.

At 1040, the UE 1004 determines a downlink beam for full-duplex reception of a downlink transmission from the base station 1002 that overlaps in time with transmission of the uplink control channel. For example, the UE 1004 may determine a downlink beam 1042 paired with the uplink beam 1032.

At 1050, the UE 1004 performs full-duplex communication with the base station 1002. For example, the UE 1004 may transmit an uplink control channel 1052 using the uplink beam 1032 and receive a downlink transmission 1054 from the base station 1002 using the downlink beam 1042. The transmission of the uplink control channel 1052 may overlap in time with the reception of the downlink transmission 1054.

In a similar manner, at 1060, the base station 1002 performs full-duplex communication with the UE 1004. For example, the base station 1002 may transmit the downlink transmission 1054 using the downlink beam 1042 and receive the uplink control channel 1052 using the uplink beam 1032. The downlink transmission 1054 may comprise a CORESET, a PDSCH, or a CSI-RS.

In some examples, the UE 1004 may determine, at 1040, the downlink beam 1042 based on scheduling information received from the base station 1002. For example, the PUCCH resource configuration 1020 may correspond to the PUCCH resource configuration 600 of FIG. 6 including the PUCCH resource index 602 and the uplink beam identifier 604. In such examples, the PUCCH resource configuration 1020 may be configured for half-duplex communication as the PUCCH resource configuration may not include a downlink beam paired with the uplink beam.

In some examples, the base station 1002 may transmit DCI 1034 that is received by the UE 1004. The DCI 1034 may schedule the transmission of the uplink control channel 1052 and the reception of the downlink transmission 1054. The DCI 1034 may include an identifier for a downlink beam paired with the uplink beam 1032 for transmitting the uplink control channel 1052. The UE 1004 may determine, at 1040, the downlink beam paired with the uplink beam 1032 based on the downlink beam identifier provided by the DCI 1034.

In some examples, the DCI 1034 may correspond to a single DCI scheduling the uplink transmission of the uplink control channel 1052 and the downlink transmission 1054. For example, the DCI 1034 may correspond to the DCI 706 of FIG. 7A. In some examples, the DCI 1034 may correspond to different DCI scheduling the uplink transmission of the uplink control channel 1052 and the downlink transmission 1054, such as the example 750 of FIG. 7B. For example, the base station 1002 may transmit a first DCI (e.g., the first DCI 756) scheduling the uplink transmission of the uplink control channel 1052. The base station 1002 may also transmit a second DCI (e.g., the second DCI 758) scheduling the downlink transmission 1054.

In some examples, the UE 1004 may determine, at 1040, the downlink beam paired with the uplink beam for transmitting the uplink control channel 1052 based on information included in the PUCCH resource configuration 1020. For example, the PUCCH resource configuration 1020 may include a TCI state field and the UE 1004 may identify the downlink beam 1042 paired with the uplink beam 1032 for transmitting the uplink control channel 1052 based on the TCI state field.

In some examples, the PUCCH resource configuration 1020 may include a bi-directional TCI state field, such as the example bi-directional TCI state field 804 of FIG. 8A. The bi-directional TCI state field may include a first beam for transmitting the uplink control channel 1052 and a second beam for full-duplex reception of the downlink transmission 1054. In such examples, the UE 1004 may determine, at 1040, the downlink beam 1042 based on the second beam of the bi-directional TCI state field. For example, and referring to the example bi-directional TCI state field 804, the UE 1004 may determine the downlink beam 1042 based on the beam identified by the downlink beam identifier 808a.

In some examples, the PUCCH resource configuration 1020 may include two single-directional TCI state fields, such as the example uplink TCI state field 822 and the downlink TCI state field 824 of the PUCCH resource configuration 820 of FIG. 8B. A first direction TCI state field may include an identifier for an uplink beam and a second direction TCI state field may include an identifier for a downlink beam. In such examples, the UE 1004 may determine, at 1040, the downlink beam 1042 based on the downlink beam identified by the second direction TCI state field. For example, and referring to the PUCCH resource configuration 820 of FIG. 8B, the UE 1004 may determine the downlink beam 1042 based on the beam identified by the downlink beam identifier 808b of the downlink TCI state field 824.

In some examples, the UE 1004 may determine, at 1040, the downlink beam paired with the uplink beam for transmitting the uplink control channel 1052 based on a reference signal (RS) configuration, a measurement, or a synchronization signal block (SSB).

For example, the UE 1004 may determine the downlink beam paired with the uplink beam for transmitting the uplink control channel 1052 based on information in a BFD/RLM reference signal configuration. For example, the BFD/RLM reference signal configuration may include a downlink beam in a CMR reference signal configuration paired with the uplink beam associated with the PUCCH resource configuration (e.g., the uplink beam indicated by the uplink beam identifier 604 of the PUCCH resource configuration 600 of FIG. 6).

In some examples, the UE 1004 may determine, at 1040, the downlink beam paired with the uplink beam for transmitting the uplink control channel 1052 based on the downlink beam of the candidate beam pair combinations having the best SINR value. For example, the candidate beam pair combinations may include different combinations of downlink beams paired with the uplink beam indicated in the PUCCH resource configuration (e.g., the uplink beam indicated by the uplink beam identifier 604 of the PUCCH resource configuration 600 of FIG. 6).

In some examples, if there are overlapping RACH occasions with downlink SSBs in a full-duplex mode, the UE 1004 may determine, at 1040, the downlink beam paired with the uplink beam for transmitting the uplink control channel 1052 based on the downlink SSB that overlaps with the RACH occasion in which the beam for transmitting the RACH occasion is the same as the uplink beam for transmitting the uplink control channel. That is, the UE 1004 may identify the paired downlink beam 1042 based on the RACH preamble beam. For example, the UE 1004 identify the RACH preamble beam that is the same as the uplink beam 1032 indicated in the PUCCH resource configuration 1020 for transmitting the uplink control channel 1052. The UE 1004 may use the downlink SSB corresponding to the identified RACH preamble beam to identify (or set) the downlink beam 1042 that pairs with the uplink beam 1032 for transmitting the uplink control channel 1052.

Figure 11:
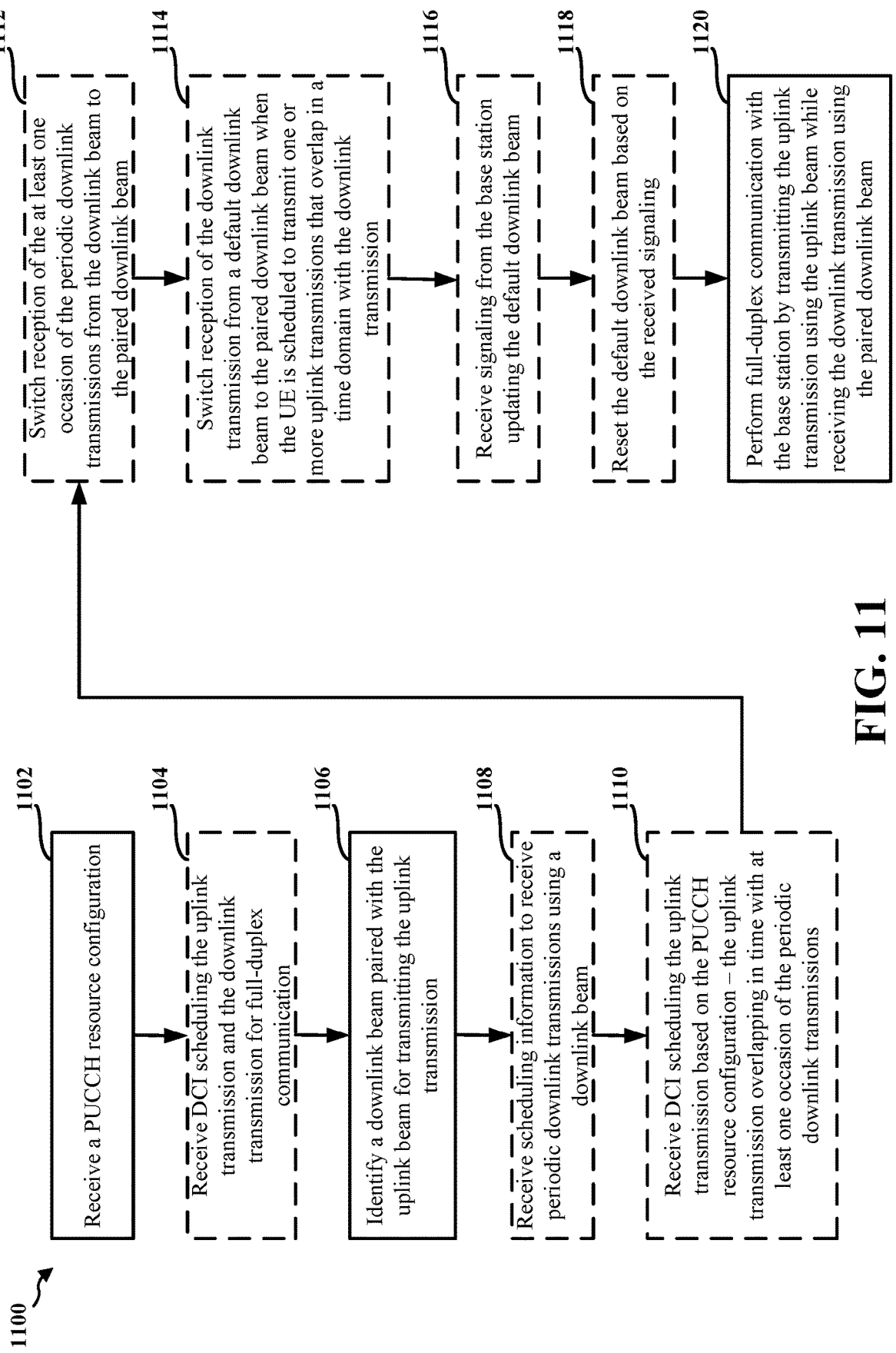
FIG. 11 is a flowchart of a method of wireless communication at a UE, in accordance with the teachings disclosed herein.

FIG. 11 is a flowchart 1100 of a method of wireless communication. The method may be performed by a UE (e.g., the UE 104, the UE 350, and/or an apparatus 1202 of FIG. 12). Optional aspects are illustrated with a dashed line. The method may enable a UE to identify a downlink beam paired with an uplink beam for transmitting an uplink transmission, such as described in connection with the aspects of FIG. 10.

At 1102, the UE receives a PUCCH resource configuration from a base station, as described in connection with the PUCCH resource configuration 1020 of FIG. 10. For example, 1102 may be performed by a PUCCH resource configuration reception component 1240 of the apparatus 1202 of FIG. 12. The PUCCH resource configuration may indicate an uplink beam for transmitting an uplink transmission. In some examples, the uplink transmission may comprise an uplink control channel, such as PUCCH.

At 1106, the UE identifies a downlink beam paired with the uplink beam for transmitting the uplink transmission, as described in connection with 1040 of FIG. 10. For example, 1106 may be performed by a downlink beam identifying component 1242 of the apparatus 1202 of FIG. 12. The paired downlink beam may facilitate full-duplex reception of a downlink transmission from the base station that overlaps in time with transmission of the uplink transmission.

At 1120, the UE performs full-duplex communication with the base station by transmitting the uplink transmission using the uplink beam while transmitting the downlink transmission using the paired downlink beam, as described in connection with 1050 of FIG. 10. For example, 1120 may be performed by a full-duplex performing component 1244 of the apparatus 1202 of FIG. 12.

In some examples, the PUCCH resource configuration may indicate an uplink beam for transmitting an uplink transmission, as described in connection with the PUCCH resource configuration 600 of FIG. 6. In some such examples, the UE may receive DCI indicating the downlink beam paired with the uplink beam for transmitting the uplink transmission. For example, at 1104, the UE may receive DCI scheduling the uplink transmission and the downlink transmission for full-duplex communication, as described in connection with the DCI 706 of FIG. 7A and/or the second DCI 758 of FIG. 7B. For example, 1104 may be performed by a DCI receiving component 1246 of the apparatus 1202 of FIG. 12. The received DCI may indicate the downlink beam paired with the uplink beam for transmitting the uplink transmission. For example, and referring to the example 700 of FIG. 7A, the DCI 706 may include a downlink beam indicator 706a indicating the downlink beam paired with the uplink beam for transmitting the uplink transmission. With respect to the example 750 of FIG. 7B, the second DCI 758 may include a downlink beam indicator 758a indicating the downlink beam paired with the uplink beam for transmitting the uplink transmission. In some such examples in which the UE receives DCI indicating the downlink beam paired with the uplink beam for transmitting the uplink transmission, the UE may identify (e.g., at 1106) the downlink beam paired with the uplink beam for transmitting the uplink transmission based on the downlink beam indicator provided by the DCI.

In some examples, the PUCCH resource configuration may indicate the downlink beam paired with the uplink beam for transmitting the uplink transmission. For example, the PUCCH resource configuration may include a TCI state field. In some such examples, the UE may identify (e.g., at 1106) the downlink beam paired with the uplink beam for transmitting the uplink transmission based on the TCI state field.

In some examples, the TCI state field may comprise a bi-directional TCI state field indicating the uplink beam for transmitting the uplink transmission and the paired downlink beam for the full-duplex reception of the downlink transmission, as described in connection with the bi-directional TCI state field 804 of the PUCCH resource configuration 800 of FIG. 8A. For example, the bi-directional TCI state field 804 includes an uplink beam identifier 806a identifying an uplink beam for transmitting an uplink transmission and a downlink beam identifier 808a identifying a downlink beam paired with the uplink beam. In some such examples, the UE may identify (e.g., at 1106) the downlink beam paired with the uplink beam for transmitting the uplink transmission based on the downlink beam identifier 808a.

In some examples, the TCI state field may include two single-directional TCI states, as described in connection with the example PUCCH resource configuration 820 of FIG. 8B. For example, the PUCCH resource configuration 820 includes an uplink TCI state field 822 including an uplink beam identifier 806b identifying an uplink beam for transmitting an uplink transmission. The PUCCH resource configuration 820 also includes a downlink TCI state field 824 including a downlink beam identifier 808b identifying a downlink beam paired with the uplink beam for transmitting the uplink transmission.

In some examples in which the PUCCH resource configuration includes a TCI state field, such as the PUCCH resource configuration 800 of FIG. 8A and/or the PUCCH resource configuration 820 of FIG. 8B, the UE may switch reception of a downlink transmission from a first downlink beam to the downlink beam indicated by the TCI state field of the PUCCH resource configuration. For example, at 1108, the UE may receive scheduling information to receive periodic downlink transmissions using a downlink beam, as described in connection with the SPS signaling 910 of FIG. 9A. For example, 1108 may be performed by a scheduling information component 1248 of the apparatus 1202 of FIG. 12.

At 1110, the UE may receive DCI scheduling the uplink transmission based on the PUCCH resource configuration, as described in connection with the DCI 914 of FIG. 9A. For example, 1110 may be performed by the DCI receiving component 1246 of the apparatus 1202 of FIG. 12. In some examples, the uplink transmission may overlap in time with at least one occasion of the periodic downlink transmissions, as described in connection with the first PUCCH transmission 916a and the second SPS downlink transmission 912b at the second time (T2) of FIG. 9A.

At 1112, the UE may switch reception of the at least one occasion of the periodic downlink transmissions from the downlink beam to the paired downlink beam, as described in connection with the second SPS downlink transmission 912b at the second time (T2) and/or the third SPS downlink transmission 912c at the third time (T3) of FIG. 9A. For example, 1112 may be performed by a beam switching component 1250 of the apparatus 1202 of FIG. 12.

In some examples in which the PUCCH resource configuration includes a TCI state field, such as the PUCCH resource configuration 800 of FIG. 8A and/or the PUCCH resource configuration 820 of FIG. 8B, the UE may switch reception of a downlink transmission from a default downlink beam to the downlink beam indicated by the TCI state field of the PUCCH resource configuration. For example, at 1114, the UE may switch reception of the downlink transmission from a default downlink beam to the paired downlink beam when the UE is scheduled to transmit one or more uplink transmissions that overlap in a time domain with the downlink transmission, as described in connection with the example 950 of FIG. 9B. For example, 1114 may be performed by the beam switching component 1250 of the apparatus 1202 of FIG. 12.

In some examples, the UE may switch the reception of the of the downlink transmission to the paired downlink beam from the default downlink beam during the overlap in the time domain, as described in connection with the reception of the of the third downlink transmission 968c of the FIG. 9B. In some examples, the UE may continue using the paired downlink beam for reception of subsequent downlink transmissions after the overlap in the time domain, as described in connection with the reception of the third downlink transmission 968c of the FIG. 9B.

In some examples, the UE may continue using the paired downlink beam for reception of subsequent downlink transmissions until the UE receives signaling updating the default downlink beam. For example, at 1116, the UE may receive signaling from the base station updating the default downlink beam, as described in connection with the default downlink beam signaling 970 of FIG. 9B. For example, 1116 may be performed by a default downlink beam component 1252 of the apparatus 1202 of FIG. 12.

At 1118, the UE may reset the default downlink beam based on the received signaling, as described in connection with the reception of the fourth downlink transmission 968d at the sixth time (T6) of FIG. 9B. For example, 1118 may be performed by a beam resetting component 1254 of the apparatus 1202 of FIG. 12.

In some examples, the UE may identify (e.g., at 1106) the downlink beam paired with the uplink beam for transmitting the uplink transmission based on a beam failure detection reference signal configuration for full-duplex communication mode. For example, the beam failure detection reference signal configuration may indicate the downlink beam paired with the uplink beam for transmitting the uplink transmission.

In some examples, the UE may identify (e.g., at 1106) the downlink beam paired with the uplink beam for transmitting the uplink transmission based on a radio link management reference signal configuration for full-duplex communication mode. For example, the radio link management reference signal configuration may indicate the downlink beam paired with the uplink beam for transmitting the uplink transmission.

In some examples, the UE may identify (e.g., at 1106) the downlink beam paired with the uplink beam for transmitting the uplink transmission based on a measurement. For example, the UE may perform a SIM measurement. In some such examples, the UE may identify the downlink beam paired with the uplink beam for transmitting the uplink transmission based on a latest SIM measurement. In some examples, the UE may perform one or more beam management (BM) measurements. In some such examples, the UE may identify the downlink beam paired with the uplink beam for transmitting the uplink transmission based on the one or more BM measurements.

In some examples, the UE may identify (e.g., at 1106) the downlink beam paired with the uplink beam for transmitting the uplink transmission based on a downlink SSB that overlaps with a RACH occasion in full-duplex communication mode. In some such examples, the UE may identify the downlink SSB corresponding to a beam associated with the RACH occasion that matches the uplink beam for transmitting the uplink transmission.

Figure 12:
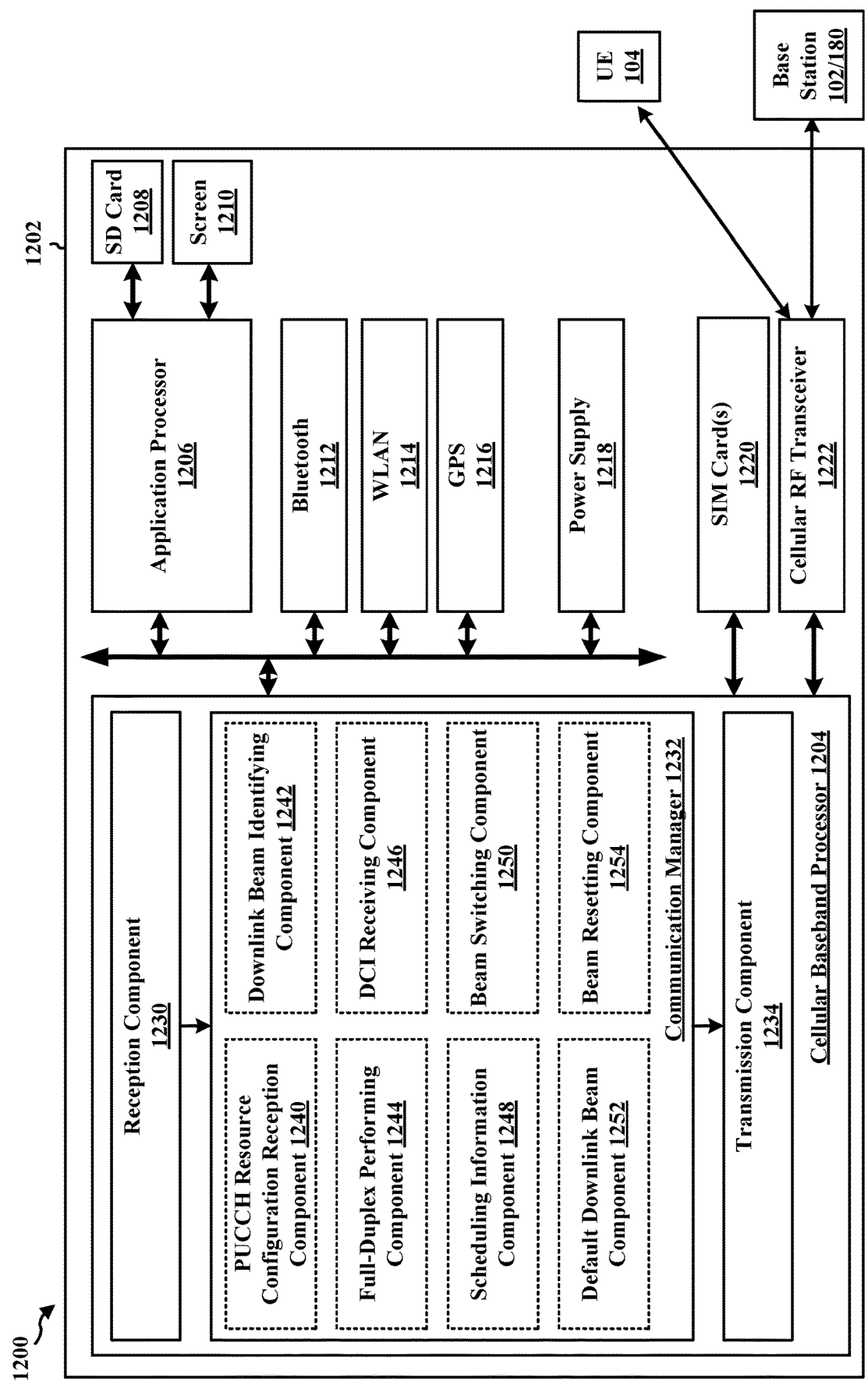
FIG. 12 is a diagram illustrating an example of a hardware implementation for an example apparatus, in accordance with the teachings disclosed herein.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or base station 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see the UE 350 of FIG. 3) and include the aforediscussed additional modules of the apparatus 1202.

The communication manager 1232 includes a PUCCH resource configuration reception component 1240 that is configured to receive a PUCCH resource configuration, for example, as described in connection with 1102 of FIG. 11. The communication manager 1232 also includes a downlink beam identifying component 1242 that is configured to identify a downlink beam paired with the uplink beam for transmitting the uplink transmission, for example, as described in connection with 1106 of FIG. 11. The communication manager 1232 also includes a full-duplex performing component 1244 that is configured to perform full-duplex communication with the base station by transmitting the uplink transmission using the uplink beam while receiving the downlink transmission using the paired downlink beam, for example, as described in connection with 1120 of FIG. 11. The communication manager 1232 also includes a DCI receiving component 1246 that is configured to receive DCI scheduling the uplink transmission and the downlink transmission for full-duplex communication, for example, as described in connection with 1104 of FIG. 11, and/or to receive DCI scheduling the uplink transmission based on the PUCCH resource configuration, and where the uplink transmission overlaps in time with at least one occasion of the periodic downlink transmissions, for example, as described in connection with 1110 of FIG. 11. The communication manager 1232 also includes a scheduling information component 1248 that is configured to receive scheduling information to receive periodic downlink transmissions using a downlink beam, for example, as described in connection with 1108 of FIG. 11. The communication manager 1232 also includes a beam switching component 1250 that is configured to switch reception of the at least one occasion of the periodic downlink transmissions from the downlink beam to the paired downlink beam, for example, as described in connection with 1112 of FIG. 11, and/or to switch reception of the downlink transmission from a default downlink beam to the paired downlink beam when the UE is scheduled to transmit one or more uplink transmissions that overlap in a time domain with the downlink transmission, for example, as described in connection with 1114 of FIG. 11. The communication manager 1232 also includes a default downlink beam component 1252 that is configured to receive signaling from the base station updating the default downlink beam, for example, as described in connection with 1116 of FIG. 11. The communication manager 1232 also includes a beam resetting component 1254 that is configured to reset the default downlink beam based on the received signaling, for example, as described in connection with 1118 of FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving a PUCCH resource configuration from a base station, the PUCCH resource configuration indicating an uplink beam for transmitting an uplink transmission. The example apparatus 1202 also includes means for identifying a downlink beam paired with the uplink beam for transmitting the uplink transmission, the paired downlink beam for full-duplex reception of a downlink transmission from the base station that overlaps in time with transmission of the uplink transmission. The example apparatus 1202 also includes means for performing full-duplex communication with the base station by transmitting the uplink transmission using the uplink beam while receiving the downlink transmission using the paired downlink beam. The example apparatus 1202 also includes means for receiving DCI scheduling the uplink transmission and the downlink transmission for full-duplex communication, and where the DCI indicates the downlink beam paired with the uplink beam for transmitting the uplink transmission. The example apparatus 1202 also includes means for identifying the paired downlink beam based on a TCI state field of the PUCCH resource configuration. The example apparatus 1202 also includes means for receiving scheduling information to receive periodic downlink transmissions using a downlink beam. The example apparatus 1202 also includes means for receiving DCI scheduling the uplink transmission based on the PUCCH resource configuration, the uplink transmission overlapping in time with at least one occasion of the periodic downlink transmissions. The example apparatus 1202 also includes means for switching reception of the at least one occasion of the periodic downlink transmissions from the downlink beam to the paired downlink beam. The example apparatus 1202 also includes means for switching reception of the downlink transmission from a default downlink beam to the paired downlink beam when the UE is scheduled to transmit one or more uplink transmissions that overlap in a time domain with the downlink transmission. The example apparatus 1202 also includes means for receiving signaling from the base station updating the default downlink beam, and where the UE continues using the paired downlink beam for the reception of the subsequent downlink transmissions until the UE receives the signaling updating the default downlink beam. The example apparatus 1202 also includes means for identifying the paired downlink beam for receiving the downlink transmission based on a beam failure detection reference signal configuration for full-duplex communication mode. The example apparatus 1202 also includes means for identifying the paired downlink beam for the full-duplex reception of the downlink transmission based on a radio link management reference signal configuration for full-duplex communication mode. The example apparatus 1202 also includes means for performing a SIM measurement, and where the UE identifies the downlink beam paired with the uplink beam for transmitting the uplink transmission based on a latest SIM measurement. The example apparatus 1202 also includes means for performing one or more BM measurements, and where the UE identifies the downlink beam paired with the uplink beam for transmitting the uplink transmission based on the one or more BM measurements. The example apparatus 1202 also includes means for identifying the downlink beam paired with the uplink beam for transmitting the uplink transmission based on a downlink SSB that overlaps with a RACH occasion in full-duplex communication mode, and where a beam associated with the RACH occasion matches the uplink beam for transmitting the uplink transmission.

The aforementioned means may be one or more of the aforementioned components of the apparatus 1202 configured to perform the functions recited by the aforementioned means. As described supra, the apparatus 1202 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 13:
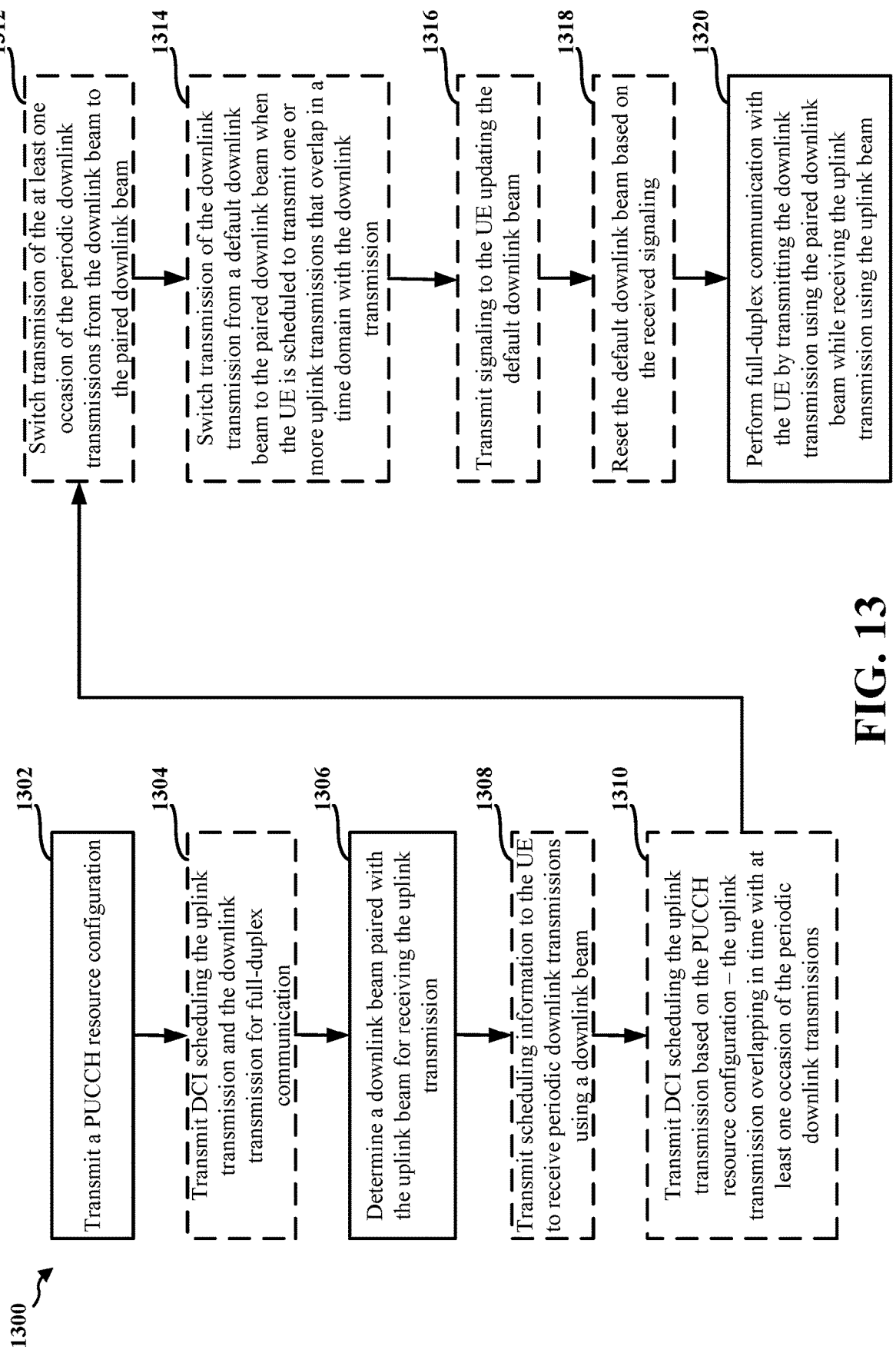
FIG. 13 is a flowchart of a method of wireless communication at a base station, in accordance with the teachings disclosed herein.

FIG. 13 is a flowchart 1300 of a method of wireless communication. The method may be performed by a base station (e.g., the base station 102/180, the base station 310, and/or an apparatus 1402 of FIG. 14). Optional aspects are illustrated with a dashed line. The method may enable a base station to identify a downlink beam paired with an uplink beam for receiving an uplink transmission, such as described in connection with the aspects of FIG. 10.

At 1302, the base station transmits a PUCCH resource configuration to a UE, as described in connection with the PUCCH resource configuration 1020 of FIG. 10. For example, 1302 may be performed by a PUCCH resource configuration transmission component 1440 of the apparatus 1402 of FIG. 14. The PUCCH resource configuration may indicate an uplink beam for receiving an uplink transmission from the UE. In some examples, the uplink transmission may comprise an uplink control channel, such as PUCCH.

At 1306, the base station determines a downlink beam paired with the uplink beam for receiving the uplink transmission, as described in connection with 1010 of FIG. 10. For example, 1306 may be performed by a downlink beam identifying component 1442 of the apparatus 1402 of FIG. 14. The paired downlink beam may facilitate full-duplex transmission of a downlink transmission to the UE that overlaps in time with reception of the uplink transmission.

At 1320, the base station performs full-duplex communication with the UE by transmitting the downlink transmission using the paired downlink beam while receiving the uplink transmission using the uplink beam, as described in connection with 1060 of FIG. 10. For example, 1320 may be performed by a full-duplex performing component 1444 of the apparatus 1402 of FIG. 14.

In some examples, the PUCCH resource configuration may indicate an uplink beam for receiving an uplink transmission from the UE, as described in connection with the PUCCH resource configuration 600 of FIG. 6. In some such examples, the base station may transmit DCI indicating the downlink beam paired with the uplink beam for receiving the uplink transmission. For example, at 1304, the base station may transmit DCI scheduling the uplink transmission and the downlink transmission for full-duplex communication, as described in connection with the DCI 706 of FIG. 7A and/or the second DCI 758 of FIG. 7B. For example, 1304 may be performed by a DCI transmitting component 1446 of the apparatus 1402 of FIG. 14. The transmitted DCI may indicate the downlink beam paired with the uplink beam for receiving the uplink transmission. For example, and referring to the example 700 of FIG. 7A, the DCI 706 may include a downlink beam indicator 706a indicating the downlink beam paired with the uplink beam for receiving the uplink transmission. With respect to the example 750 of FIG. 7B, the second DCI 758 may include a downlink beam indicator 758a indicating the downlink beam paired with the uplink beam for receiving the uplink transmission. In some such examples in which the base station transmits DCI indicating the downlink beam paired with the uplink beam for receiving the uplink transmission, the base station may determine (e.g., at 1306) the downlink beam paired with the uplink beam for receiving the uplink transmission based on the downlink beam indicator provided by the DCI.

In some examples, the PUCCH resource configuration may indicate the downlink beam paired with the uplink beam for receiving the uplink transmission. For example, the PUCCH resource configuration may include a TCI state field. In some such examples, the base station may determine (e.g., at 1306) the downlink beam paired with the uplink beam for receiving the uplink transmission based on the TCI state field.

In some examples, the TCI state field may comprise a bi-directional TCI state field indicating the uplink beam for receiving the uplink transmission and the paired downlink beam for the full-duplex transmission of the downlink transmission, as described in connection with the bi-directional TCI state field 804 of the PUCCH resource configuration 800 of FIG. 8A. For example, the bi-directional TCI state field 804 includes an uplink beam identifier 806a identifying an uplink beam for transmitting an uplink transmission and a downlink beam identifier 808a identifying a downlink beam paired with the uplink beam. In some such examples, the base station may determine (e.g., at 1306) the downlink beam paired with the uplink beam for receiving the uplink transmission based on the downlink beam identifier 808a.

In some examples, the TCI state field may include two single-directional TCI states, as described in connection with the example PUCCH resource configuration 820 of FIG. 8B. For example, the PUCCH resource configuration 820 includes an uplink TCI state field 822 including an uplink beam identifier 806b identifying an uplink beam for the UE to transmit an uplink transmission. The PUCCH resource configuration 820 also includes a downlink TCI state field 824 including a downlink beam identifier 808b identifying a downlink beam paired with the uplink beam.

In some examples in which the PUCCH resource configuration includes a TCI state field, such as the PUCCH resource configuration 800 of FIG. 8A and/or the PUCCH resource configuration 820 of FIG. 8B, the base station may switch transmission of a downlink transmission from a first downlink beam to the downlink beam indicated by the TCI state field of the PUCCH resource configuration. For example, at 1308, the base station may transmit scheduling information to the UE to receive periodic downlink transmissions using a downlink beam, as described in connection with the SPS signaling 910 of FIG. 9A. For example, 1308 may be performed by a scheduling information component 1448 of the apparatus 1402 of FIG. 14.

At 1310, the base station may transmit DCI scheduling the uplink transmission based on the PUCCH resource configuration, as described in connection with the DCI 914 of FIG. 9A. For example, 1310 may be performed by the DCI transmitting component 1446 of the apparatus 1402 of FIG. 14. In some examples, the uplink transmission may overlap in time with at least one occasion of the periodic downlink transmissions, as described in connection with the first PUCCH transmission 916a and the second SPS downlink transmission 912b at the second time (T2) of FIG. 9A.

At 1312, the base station may switch transmission of the at least one occasion of the periodic downlink transmissions from the downlink beam to the paired downlink beam, as described in connection with the second SPS downlink transmission 912b at the second time (T2) and/or the third SPS downlink transmission 912c at the third time (T3) of FIG. 9A. For example, 1312 may be performed by a beam switching component 1450 of the apparatus 1402 of FIG. 14.

In some examples in which the PUCCH resource configuration includes a TCI state field, such as the PUCCH resource configuration 800 of FIG. 8A and/or the PUCCH resource configuration 820 of FIG. 8B, the base station may switch transmission of a downlink transmission from a default downlink beam to the downlink beam indicated by the TCI state field of the PUCCH resource configuration. For example, at 1314, the base station may switch transmission of the downlink transmission from a default downlink beam to the paired downlink beam when the UE is scheduled to transmit one or more uplink transmissions that overlap in a time domain with the downlink transmission, as described in connection with the example 950 of FIG. 9B. For example, 1314 may be performed by the beam switching component 1450 of the apparatus 1402 of FIG. 14.

In some examples, the base station may switch the transmission of the of the downlink transmission to the paired downlink beam from the default downlink beam during the overlap in the time domain, as described in connection with the reception of the of the third downlink transmission 968c of the FIG. 9B. In some examples, the base station may continue using the paired downlink beam for transmission of subsequent downlink transmissions after the overlap in the time domain, as described in connection with the reception of the third downlink transmission 968c of the FIG. 9B.

In some examples, the base station may continue using the paired downlink beam for transmission of subsequent downlink transmissions until the base station transmits signaling to the UE updating the default downlink beam. For example, at 1316, the base station may transmit signaling to the UE updating the default downlink beam, as described in connection with the default downlink beam signaling 970 of FIG. 9B. For example, 1316 may be performed by a default downlink beam component 1452 of the apparatus 1402 of FIG. 14.

At 1318, the base station may reset the default downlink beam based on the transmit signaling, as described in connection with the fourth downlink transmission 968d at the sixth time (T6) of FIG. 9B. For example, 1318 may be performed by a beam resetting component 1454 of the apparatus 1402 of FIG. 14.

In some examples, the base station may determine (e.g., at 1306) the downlink beam paired with the uplink beam for receiving the uplink transmission based on a beam failure detection reference signal configuration for full-duplex communication mode. For example, the beam failure detection reference signal configuration may indicate the downlink beam paired with the uplink beam for receiving the uplink transmission.

In some examples, the base station may determine (e.g., at 1306) the downlink beam paired with the uplink beam for receiving the uplink transmission based on a radio link management reference signal configuration for full-duplex communication mode. For example, the radio link management reference signal configuration may indicate the downlink beam paired with the uplink beam for receiving the uplink transmission.

In some examples, the base station may determine (e.g., at 1306) the downlink beam paired with the uplink beam for receiving the uplink transmission based on a measurement. For example, the UE may perform a SIM measurement. In some such examples, the base station may determine the downlink beam paired with the uplink beam for receiving the uplink transmission based on a latest SIM measurement received from the UE. In some examples, the UE may perform one or more beam management (BM) measurements. In some such examples, the base station may determine the downlink beam paired with the uplink beam for receiving the uplink transmission based on the one or more BM measurements received from the UE.

In some examples, the base station may determine (e.g., at 1306) the downlink beam paired with the uplink beam for transmitting the uplink transmission based on a downlink SSB that overlaps with a RACH occasion in full-duplex communication mode. In some such examples, the base station may determine the downlink SSB corresponding to a beam associated with the RACH occasion that matches the uplink beam for receiving the uplink transmission.

Figure 14:
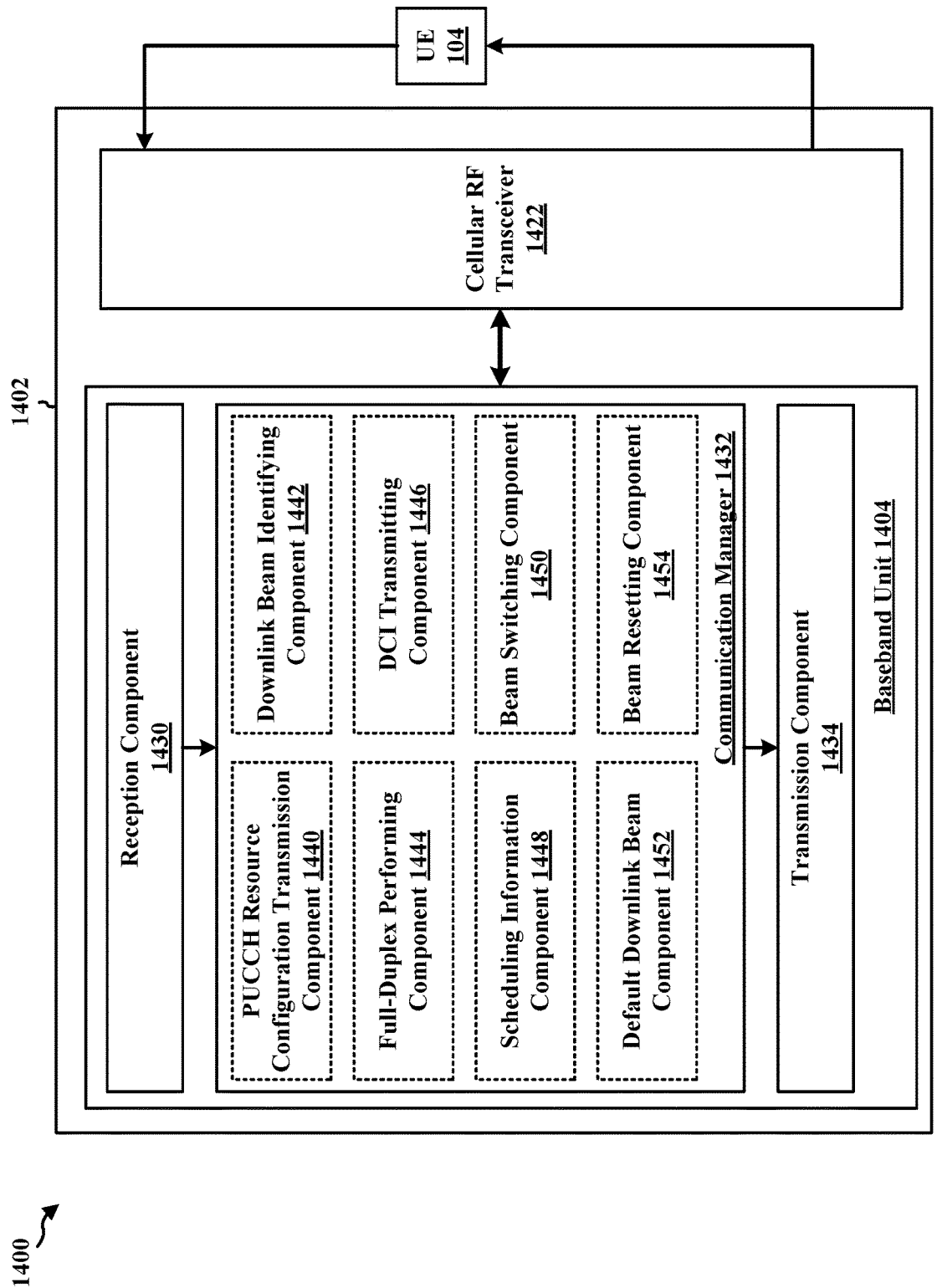
FIG. 14 is a diagram illustrating an example of a hardware implementation for an example apparatus, in accordance with the teachings disclosed herein.

FIG. 14 is a diagram 1400 illustrating an example of a hardware implementation for an apparatus 1402. The apparatus 1402 is a base station and includes a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes a PUCCH resource configuration transmission component 1440 that is configured to transmit a PUCCH resource configuration to a UE, for example, as described in connection with 1302 of FIG. 13. The communication manager 1432 also includes a downlink beam identifying component 1442 that is configured to determine a downlink beam paired with the uplink beam for receiving the uplink transmission, for example, as described in connection with 1306 of FIG. 13. The communication manager 1432 also includes a full-duplex performing component 1444 that is configured to perform full-duplex communication with the UE by transmitting the downlink transmission using the paired downlink beam while receiving the uplink transmission using the uplink beam, for example, as described in connection with 1320 of FIG. 13. The communication manager 1432 also includes a DCI transmitting component 1446 that is configured to transmit DCI scheduling the uplink transmission and the downlink transmission for full-duplex communication, for example, as described in connection with 1304 of FIG. 13, and/or to transmit DCI scheduling the uplink transmission based on the PUCCH resource configuration, for example, as described in connection with 1310 of FIG. 13. The communication manager 1432 also includes a scheduling information component 1448 that is configured to transmit scheduling information to the UE to receive periodic downlink transmissions using a downlink beam, for example, as described in connection with 1308 of FIG. 13. The communication manager 1432 also includes a beam switching component 1450 that is configured to switch transmission of the at least one occasion of the periodic downlink transmissions from the downlink beam to the paired downlink beam, for example, as described in connection with 1312 of FIG. 13, and/or to switch transmission of the downlink transmission from a default downlink beam to the paired downlink beam when the UE is scheduled to transmit one or more uplink transmissions that overlap in a time domain with the downlink transmission, for example, as described in connection with 1314 of FIG. 13. The communication manager 1432 also includes a default downlink beam component 1452 that is configured to transmit signaling to the UE updating the default downlink beam, for example, as described in connection with 1316 of FIG. 13. The communication manager 1432 also includes a beam resetting component 1454 that is configured to reset the default downlink beam based on the transmit signaling, for example, as described in connection with 1318 of FIG. 13.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for transmitting a PUCCH resource configuration to a UE, the PUCCH resource configuration indicating an uplink beam for receiving an uplink transmission. The example apparatus 1402 also includes means for determining a downlink beam paired with the uplink beam for receiving the uplink transmission, the paired downlink beam for full-duplex transmission of a downlink transmission to the UE that overlaps in time with reception of the uplink transmission. The example apparatus 1402 also includes means for performing full-duplex communication with the UE by transmitting the downlink transmission using the paired downlink beam while receiving the uplink transmission using the uplink beam. The example apparatus 1402 also includes means for transmitting DCI scheduling the uplink transmission and the downlink transmission for full-duplex communication, and where the DCI indicates the downlink beam paired with the uplink beam for receiving the uplink transmission. The example apparatus 1402 also includes means for determining the paired downlink beam based on the TCI state field of a PUCCH resource configuration. The example apparatus 1402 also includes means for transmitting scheduling information to the UE to receive periodic downlink transmissions using a downlink beam. The example apparatus 1402 also includes means for transmitting DCI scheduling the uplink transmission based on the PUCCH resource configuration, the uplink transmission overlapping in time with at least one occasion of the periodic downlink transmissions. The example apparatus 1402 also includes means for switching transmission of the at least one occasion of the periodic downlink transmissions from the downlink beam to the paired downlink beam. The example apparatus 1402 also includes means for switching transmission of the downlink transmission from a default downlink beam to the paired downlink beam when the UE is scheduled to transmit one or more uplink transmissions that overlap in a time domain with the downlink transmission. The example apparatus 1402 also includes means for switching the transmission of the downlink transmission to the paired downlink beam from the default downlink beam during the overlap in the time domain. The example apparatus 1402 also includes means for transmitting signaling to the UE updating the default downlink beam, and where the base station continues using the paired downlink beam for the transmission of the subsequent downlink transmissions until the base station transmits the signaling updating the default downlink beam. The example apparatus 1402 also includes means for determining the paired downlink beam to use for transmitting the downlink transmission based on a beam failure detection reference signal configuration for full-duplex communication mode. The example apparatus 1402 also includes means for determining the paired downlink beam to use for transmitting the downlink transmission based on a radio link management reference signal configuration for full-duplex communication mode. The example apparatus 1402 also includes means for receiving one or more SIM measurements from the UE, and where the base station determines the downlink beam paired with the uplink beam for receiving the uplink transmission based on a latest SIM measurement. The example apparatus 1402 also includes means for receiving one or more BM measurements from the UE, and where the base station determines the downlink beam paired with the uplink beam for receiving the uplink transmission based on the one or more BM measurements. The example apparatus 1402 also includes means for determining the downlink beam paired with the uplink beam for receiving the uplink transmission based on a downlink SSB that overlaps with a RACH occasion in full-duplex communication mode, and where a beam associated with the RACH occasion matches the uplink beam for receiving the uplink transmission.

The aforementioned means may be one or more of the aforementioned components of the apparatus 1402 configured to perform the functions recited by the aforementioned means. As described supra, the apparatus 1402 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a user equipment (UE), comprising: receiving a PUCCH resource configuration from a base station, the PUCCH resource configuration indicating an uplink beam for transmitting an uplink transmission; identifying a downlink beam paired with the uplink beam for transmitting the uplink transmission, the paired downlink beam for full-duplex reception of a downlink transmission from the base station that overlaps in time with transmission of the uplink transmission; and performing full-duplex communication with the base station by transmitting the uplink transmission using the uplink beam while receiving the downlink transmission using the paired downlink beam.

Aspect 2 is the method of aspect 1, further including that the uplink transmission comprises an uplink control channel.

Aspect 3 is the method of any of aspect 1 or aspect 2, further including that the UE receives DCI scheduling the uplink transmission and the downlink transmission for full-duplex communication, and wherein the DCI indicates the downlink beam paired with the uplink beam for transmitting the uplink transmission.

Aspect 4 is the method of any of aspects 1 to 3, further including that the PUCCH resource configuration indicates the downlink beam paired with the uplink beam for transmitting the uplink transmission.

Aspect 5 is the method of any of aspects 1 to 4, further including that the PUCCH resource configuration includes a TCI state field and the UE identifies the paired downlink beam based on the TCI state field.

Aspect 6 is the method of any of aspects 1 to 5, further including that the TCI state field comprises a bi-directional TCI state field indicating the uplink beam for transmitting the uplink transmission and the paired downlink beam for the full-duplex reception of the downlink transmission.

Aspect 7 is the method of any of aspects 1 to 6, further including that the PUCCH resource configuration includes an uplink TCI state field indicating the uplink beam for transmitting the uplink transmission and a downlink TCI state field indicating the paired downlink beam for the full-duplex reception of the downlink transmission.

Aspect 8 is the method of any of aspects 1 to 7, further including: receiving scheduling information to receive periodic downlink transmissions using a downlink beam; receiving DCI scheduling the uplink transmission based on the PUCCH resource configuration, the uplink transmission overlapping in time with at least one occasion of the periodic downlink transmissions; and switching reception of the at least one occasion of the periodic downlink transmissions from the downlink beam to the paired downlink beam.

Aspect 9 is the method of any of aspects 1 to 8, further including: switching reception of the downlink transmission from a default downlink beam to the paired downlink beam when the UE is scheduled to transmit one or more uplink transmissions that overlap in a time domain with the downlink transmission.

Aspect 10 is the method of any of aspects 1 to 9, further including that the UE switches the reception of the downlink transmission to the paired downlink beam from the default downlink beam during the overlap in the time domain.

Aspect 11 is the method of any of aspects 1 to 10, further including that the UE continues using the paired downlink beam for reception of subsequent downlink transmissions after the overlap in the time domain.

Aspect 12 is the method of any of aspects 1 to 11, further including: receiving signaling from the base station updating the default downlink beam, wherein the UE continues using the paired downlink beam for the reception of the subsequent downlink transmissions until the UE receives the signaling updating the default downlink beam.

Aspect 13 is the method of any of aspects 1 to 12, further including that the UE identifies the paired downlink beam for receiving the downlink transmission based on a beam failure detection reference signal configuration for full-duplex communication mode.

Aspect 14 is the method of any of aspects 1 to 13, further including that the beam failure detection reference signal configuration indicates the downlink beam paired with the uplink beam for transmitting the uplink transmission.

Aspect 15 is the method of any of aspects 1 to 14, further including that the UE identifies the paired downlink beam for the full-duplex reception of the downlink transmission based on a radio link management reference signal configuration for full-duplex communication mode.

Aspect 16 is the method of any of aspects 1 to 15, further including that the radio link management reference signal configuration indicates the downlink beam paired with the uplink beam for transmitting the uplink transmission.

Aspect 17 is the method of any of aspects 1 to 16, further including: performing a SIM measurement, wherein the UE identifies the downlink beam paired with the uplink beam for transmitting the uplink transmission based on a latest SIM measurement.

Aspect 18 is the method of any of aspects 1 to 17, further including: performing one or more BM measurements, wherein the UE identifies the downlink beam paired with the uplink beam for transmitting the uplink transmission based on the one or more BM measurements.

Aspect 19 is the method of any of aspects 1 to 18, further including that the UE identifies the downlink beam paired with the uplink beam for transmitting the uplink transmission based on a downlink SSB that overlaps with a RACH occasion in full-duplex communication mode, wherein a beam associated with the RACH occasion matches the uplink beam for transmitting the uplink transmission.

Aspect 20 is an apparatus for wireless communication including at least one processor coupled to a memory and configured to implement a method as in any of aspects 1 to 19.

Aspect 21 is an apparatus for wireless communication including means for implementing a method as in any of aspects 1 to 19.

Aspect 22 is a computer-readable medium storing computer executable code, where the code, when executed, causes a processor to implement a method as in any of aspects 1 to 19.

Aspect 23 is a method of wireless communication of a base station, comprising: transmitting a PUCCH resource configuration to a UE, the PUCCH resource configuration indicating an uplink beam for receiving an uplink transmission; determining a downlink beam paired with the uplink beam for receiving the uplink transmission, the paired downlink beam for full-duplex transmission of a downlink transmission to the UE that overlaps in time with reception of the uplink transmission; and performing full-duplex communication with the UE by transmitting the downlink transmission using the paired downlink beam while receiving the uplink transmission using the uplink beam.

Aspect 24 is the method of aspect 23, further including that the uplink transmission comprises an uplink control channel.

Aspect 25 is the method of any of aspect 23 or aspect 24, further including that the base station transmits DCI scheduling the uplink transmission and the downlink transmission for full-duplex communication, and wherein the DCI indicates the downlink beam paired with the uplink beam for receiving the uplink transmission.

Aspect 26 is the method of any of aspects 23 to 25, further including that the PUCCH resource configuration indicates the downlink beam paired with the uplink beam for receiving the uplink transmission.

Aspect 27 is the method of any of aspects 23 to 26, further including that the PUCCH resource configuration includes a TCI state field and the base station determines the paired downlink beam based on the TCI state field.

Aspect 28 is the method of any of aspects 23 to 27, further including that the TCI state field comprises a bi-directional TCI state field indicating the uplink beam for receiving the uplink transmission and the paired downlink beam for the full-duplex transmission of the downlink transmission.

Aspect 29 is the method of any of aspects 23 to 28, further including that the PUCCH resource configuration includes an uplink TCI state field indicating the uplink beam for receiving the uplink transmission and a downlink TCI state field indicating the paired downlink beam for the full-duplex transmission of the downlink transmission.

Aspect 30 is the method of any of aspects 23 to 29, further including: transmitting scheduling information to the UE to receive periodic downlink transmissions using a downlink beam; transmitting DCI scheduling the uplink transmission based on the PUCCH resource configuration, the uplink transmission overlapping in time with at least one occasion of the periodic downlink transmissions; and switching transmission of the at least one occasion of the periodic downlink transmissions from the downlink beam to the paired downlink beam.

Aspect 31 is the method of any of aspects 23 to 30, further including: switching transmission of the downlink transmission from a default downlink beam to the paired downlink beam when the UE is scheduled to transmit one or more uplink transmissions that overlap in a time domain with the downlink transmission.

Aspect 32 is the method of any of aspects 23 to 31, further including that the base station switches the transmission of the downlink transmission to the paired downlink beam from the default downlink beam during the overlap in the time domain.

Aspect 33 is the method of any of aspects 23 to 32, further including that the base station continues using the paired downlink beam for transmission of subsequent downlink transmissions after the overlap in the time domain.

Aspect 34 is the method of any of aspects 23 to 33, further including: transmitting signaling to the UE updating the default downlink beam, wherein the base station continues using the paired downlink beam for the transmission of the subsequent downlink transmissions until the base station transmits the signaling updating the default downlink beam.

Aspect 35 is the method of any of aspects 23 to 34, further including that the base station determines the paired downlink beam to use for transmitting the downlink transmission based on a beam failure detection reference signal configuration for full-duplex communication mode.

Aspect 36 is the method of any of aspects 23 to 35, further including that the beam failure detection reference signal configuration indicates the downlink beam paired with the uplink beam for receiving the uplink transmission.

Aspect 37 is the method of any of aspects 23 to 36, further including that the base station determines the paired downlink beam to use for transmitting the downlink transmission based on a radio link management reference signal configuration for full-duplex communication mode.

Aspect 38 is the method of any of aspects 23 to 37, further including that the radio link management reference signal configuration indicates the downlink beam paired with the uplink beam for receiving the uplink transmission.

Aspect 39 is the method of any of aspects 23 to 38, further including: receiving one or more SIM measurements from the UE, and wherein the base station determines the downlink beam paired with the uplink beam for receiving the uplink transmission based on a latest SIM measurement.

Aspect 40 is the method of any of aspects 23 to 39, further including: receiving one or more BM measurements from the UE, and wherein the base station determines the downlink beam paired with the uplink beam for receiving the uplink transmission based on the one or more BM measurements.

Aspect 41 is the method of any of aspects 23 to 40, further including that the base station determines the downlink beam paired with the uplink beam for receiving the uplink transmission based on a downlink SSB that overlaps with a RACH occasion in full-duplex communication mode, wherein a beam associated with the RACH occasion matches the uplink beam for receiving the uplink transmission.

Aspect 42 is an apparatus for wireless communication including at least one processor coupled to a memory and configured to implement a method as in any of aspects 23 to 41.

Aspect 43 is an apparatus for wireless communication including means for implementing a method as in any of aspects 23 to 41.

Aspect 44 is a computer-readable medium storing computer executable code, where the code, when executed, causes a processor to implement a method as in any of aspects 23 to 41.

What is claimed is:

1. A method of wireless communication of a user equipment (UE), comprising:
receiving a physical uplink control channel (PUCCH) resource configuration from a base station, the PUCCH resource configuration indicating an uplink beam for transmitting an uplink transmission;
identifying a downlink beam paired with the uplink beam for transmitting the uplink transmission, the paired downlink beam for full-duplex reception of a downlink transmission from the base station that overlaps in time with transmission of the uplink transmission; and
performing full-duplex communication with the base station by transmitting the uplink transmission using the uplink beam while receiving the downlink transmission using the paired downlink beam.

2. The method of claim 1, wherein the uplink transmission comprises an uplink control channel.

3. The method of claim 1, wherein the UE receives downlink control information (DCI) scheduling the uplink transmission and the downlink transmission for full-duplex communication, and wherein the DCI indicates the downlink beam paired with the uplink beam for transmitting the uplink transmission.

4. The method of claim 1, wherein the PUCCH resource configuration includes a transmission configuration indicator (TCI) state field and the UE identifies the paired downlink beam based on the TCI state field.

5. The method of claim 4, wherein the TCI state field comprises a bi-directional TCI state field indicating the uplink beam for transmitting the uplink transmission and the paired downlink beam for the full-duplex reception of the downlink transmission.

6. The method of claim 4, wherein the PUCCH resource configuration includes
an uplink transmission configuration indicator (TCI) state field indicating the uplink beam for transmitting the uplink transmission and
a downlink TCI state field indicating the paired downlink beam for the full-duplex reception of the downlink transmission.

7. The method of claim 4, further comprising:
receiving scheduling information to receive periodic downlink transmissions using a downlink beam;
receiving downlink control information (DCI) scheduling the uplink transmission based on the PUCCH resource configuration, the uplink transmission overlapping in time with at least one occasion of the periodic downlink transmissions; and
switching reception of the at least one occasion of the periodic downlink transmissions from the downlink beam to the paired downlink beam.

8. The method of claim 4, further comprising:
switching reception of the downlink transmission from a default downlink beam to the paired downlink beam when the UE is scheduled to transmit one or more uplink transmissions that overlap in a time domain with the downlink transmission.

9. The method of claim 8, wherein the UE switches the reception of the downlink transmission to the paired downlink beam from the default downlink beam during the overlap in the time domain, and wherein the UE continues using the paired downlink beam for reception of subsequent downlink transmissions after the overlap in the time domain.

10. The method of claim 9, further comprising:
receiving signaling from the base station updating the default downlink beam, wherein the UE continues using the paired downlink beam for the reception of the subsequent downlink transmissions until the UE receives the signaling updating the default downlink beam.

11. The method of claim 1, wherein the UE identifies the paired downlink beam for receiving the downlink transmission based on a beam failure detection reference signal configuration for full-duplex communication mode, and
wherein the beam failure detection reference signal configuration indicates the downlink beam paired with the uplink beam for transmitting the uplink transmission.

12. The method of claim 1, wherein the UE identifies the paired downlink beam for the full-duplex reception of the downlink transmission based on a radio link management reference signal configuration for full-duplex communication mode, and
wherein the radio link management reference signal configuration indicates the downlink beam paired with the uplink beam for transmitting the uplink transmission.

13. The method of claim 1, further comprising:
performing a self-interference measurement (SIM) measurement or one or more beam management (BM) measurements, and
wherein the UE identifies the downlink beam paired with the uplink beam for transmitting the uplink transmission based on a latest SIM measurement or based on the one or more BM measurements.

14. The method of claim 1, wherein the UE identifies the downlink beam paired with the uplink beam for transmitting the uplink transmission based on a downlink synchronization signal block (SSB) that overlaps with a random access channel (RACH) occasion in full-duplex communication mode, wherein a beam associated with the RACH occasion matches the uplink beam for transmitting the uplink transmission.

15. An apparatus for wireless communication of a user equipment (UE), comprising:
a memory; and
at least one processor coupled to the memory and configured to:
receive a physical uplink control channel (PUCCH) resource configuration from a base station, the PUCCH resource configuration indicating an uplink beam for transmitting an uplink transmission;
identify a downlink beam paired with the uplink beam for transmitting the uplink transmission, the paired downlink beam for full-duplex reception of a downlink transmission from the base station that overlaps in time with transmission of the uplink transmission; and
perform full-duplex communication with the base station by transmitting the uplink transmission using the uplink beam while receiving the downlink transmission using the paired downlink beam.

16. A method of wireless communication of a base station, comprising:
transmitting a physical uplink control channel (PUCCH) resource configuration to a user equipment (UE), the PUCCH resource configuration indicating an uplink beam for receiving an uplink transmission;
determining a downlink beam paired with the uplink beam for receiving the uplink transmission, the paired downlink beam for full-duplex transmission of a downlink transmission to the UE that overlaps in time with reception of the uplink transmission; and performing full-duplex communication with the UE by transmitting the downlink transmission using the paired downlink beam while receiving the uplink transmission using the uplink beam.

17. The method of claim 16, wherein the uplink transmission comprises an uplink control channel.

18. The method of claim 16, wherein the base station transmits downlink control information (DCI) scheduling the uplink transmission and the downlink transmission for full-duplex communication, and wherein the DCI indicates the downlink beam paired with the uplink beam for receiving the uplink transmission.

19. The method of claim 16, wherein the PUCCH resource configuration includes a transmission configuration indicator (TCI) state field and the base station determines the paired downlink beam based on the TCI state field.

20. The method of claim 19, wherein the TCI state field comprises a bi-directional TCI state field indicating the uplink beam for receiving the uplink transmission and the paired downlink beam for the full-duplex transmission of the downlink transmission.

21. The method of claim 19, wherein the PUCCH resource configuration includes
an uplink transmission configuration indicator (TCI) state field indicating the uplink beam for receiving the uplink transmission and
a downlink TCI state field indicating the paired downlink beam for the full-duplex transmission of the downlink transmission.

22. The method of claim 19, further comprising:
transmitting scheduling information to the UE to receive periodic downlink transmissions using a downlink beam;
transmitting downlink control information (DCI) scheduling the uplink transmission based on the PUCCH resource configuration, the uplink transmission overlapping in time with at least one occasion of the periodic downlink transmissions; and
switching transmission of the at least one occasion of the periodic downlink transmissions from the downlink beam to the paired downlink beam.

23. The method of claim 19, further comprising:
switching transmission of the downlink transmission from a default downlink beam to the paired downlink beam when the UE is scheduled to transmit one or more uplink transmissions that overlap in a time domain with the downlink transmission.

24. The method of claim 23, wherein the base station switches the transmission of the downlink transmission to the paired downlink beam from the default downlink beam during the overlap in the time domain, and wherein the base station continues using the paired downlink beam for transmission of subsequent downlink transmissions after the overlap in the time domain.

25. The method of claim 24, further comprising:
transmitting signaling to the UE updating the default downlink beam, wherein the base station continues using the paired downlink beam for the transmission of the subsequent downlink transmissions until the base station transmits the signaling updating the default downlink beam.

26. The method of claim 16, wherein the base station determines the paired downlink beam to use for transmitting the downlink transmission based on a beam failure detection reference signal configuration for full-duplex communication mode, and wherein the beam failure detection reference signal configuration indicates the downlink beam paired with the uplink beam for receiving the uplink transmission.

27. The method of claim 16, wherein the base station determines the paired downlink beam to use for transmitting the downlink transmission based on a radio link management reference signal configuration for full-duplex communication mode, and wherein the radio link management reference signal configuration indicates the downlink beam paired with the uplink beam for receiving the uplink transmission.

28. The method of claim 16, further comprising:
receiving one or more self-interference measurement (SIM) measurements from the UE or one or more beam management (BM) measurements from the UE, and
wherein the base station determines the downlink beam paired with the uplink beam for receiving the uplink transmission based on a latest SIM measurement or based on the one or more BM measurements.

29. The method of claim 16, wherein the base station determines the downlink beam paired with the uplink beam for receiving the uplink transmission based on a downlink synchronization signal block (SSB) that overlaps with a random access channel (RACH) occasion in full-duplex communication mode, wherein a beam associated with the RACH occasion matches the uplink beam for receiving the uplink transmission.

30. An apparatus for wireless communication of a base station, comprising:
a memory; and
at least one processor coupled to the memory and configured to:
transmit a physical uplink control channel (PUCCH) resource configuration to a user equipment (UE), the PUCCH resource configuration indicating an uplink beam for receiving an uplink transmission;
determine a downlink beam paired with the uplink beam for receiving the uplink transmission, the paired downlink beam for full-duplex transmission of a downlink transmission to the UE that overlaps in time with reception of the uplink transmission; and
perform full-duplex communication with the UE by transmitting the downlink transmission using the paired downlink beam while receiving the uplink transmission using the uplink beam.

* * * * *